United States Patent
Baldemair et al.

(10) Patent No.: US 12,471,083 B2
(45) Date of Patent: Nov. 11, 2025

(54) METHODS OF HARQ CODEBOOK DETERMINATION FOR LOW LATENCY COMMUNICATIONS

(71) Applicant: TELEFONAKTIEBOLAGET LM ERICSSON (PUBL), Stockholm (SE)

(72) Inventors: Robert Baldemair, Solna (SE); Sorour Falahati, Stockholm (SE); Ali Behravan, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 579 days.

(21) Appl. No.: 17/431,240

(22) PCT Filed: Feb. 13, 2020

(86) PCT No.: PCT/IB2020/051222
§ 371 (c)(1),
(2) Date: Aug. 16, 2021

(87) PCT Pub. No.: WO2020/165847
PCT Pub. Date: Aug. 20, 2020

(65) Prior Publication Data
US 2022/0053532 A1    Feb. 17, 2022

Related U.S. Application Data

(60) Provisional application No. 62/806,514, filed on Feb. 15, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/0446* (2013.01); *H04W 72/23* (2023.01)

(58) Field of Classification Search
CPC ............... H04L 1/1812; H04L 5/0053; H04W 72/0446; H04W 72/23; H04W 72/1273
See application file for complete search history.

(56) References Cited

U.S. PATENT DOCUMENTS

2014/0092865 A1   4/2014  Heo et al.
2017/0353947 A1  12/2017  Ang et al.
(Continued)

FOREIGN PATENT DOCUMENTS

CN   104412685 A   3/2015
CN   104798427 A   7/2015
(Continued)

OTHER PUBLICATIONS

Nokia et al. "Remaining aspects of HARQ management", 3GPP TSG RAN WG1 Meeting 90bis R1-1718621, Oct. 9-13, 2017, Prague, Czech.
(Continued)

*Primary Examiner* — Elton Williams

(57) ABSTRACT

According to certain embodiments, a method performed by a wireless device includes receiving, from a network node, downlink control information (DCI). The method also includes determining, based on the DCI, a first group of downlink channel sub-slots for downlink channel transmissions. The first group of downlink channel sub-slots corresponds to a group of uplink channel sub-slots and is associated with one or more uplink resources in the corresponding group of uplink channel sub-slots. The method additionally includes constructing a first HARQ codebook comprising acknowledgment (ACK) and/or negative acknowledgement (NACK) feedback for the downlink channel transmissions scheduled in the first group of downlink channel sub-slots. The method further includes transmitting the ACK and/or NACK feedback, using the one or
(Continued)

more uplink resources, according to the first HARQ codebook.

26 Claims, 19 Drawing Sheets

(51) Int. Cl.
*H04L 5/00* (2006.01)
*H04W 72/0446* (2023.01)
*H04W 72/23* (2023.01)

(56) References Cited

U.S. PATENT DOCUMENTS

2018/0132264 A1* 5/2018 Jung .................... H04L 1/1854
2018/0343649 A1   11/2018 Xu et al.
2019/0045533 A1*  2/2019 Chatterjee ............ H04L 5/0053

FOREIGN PATENT DOCUMENTS

| | | |
|---|---|---|
| CN | 106797642 A | 5/2017 |
| CN | 109152004 A | 1/2019 |
| WO | 2018151637 A1 | 8/2018 |
| WO | 2018230996 A1 | 12/2018 |

OTHER PUBLICATIONS

Nokia et al., "On the mini-slot design in NR", 3GPP TSG-RAN WG1#NR, R1-1701052, Spokane, USA, Jan. 16-20, 2017.
Nokia et al., "Remaining open items on PUCCH resource allocation", 3GPP TSG-RAN WG1 # 92, R1-1802026, Greece, Athens Feb. 26-Mar. 2, 2018.

* cited by examiner

METHODS OF HARQ CODEBOOK DETERMINATION FOR LOW LATENCY COMMUNICATIONS

PRIORITY

This application is a national stage application of International Patent Application No. PCT/IB2020/051222, filed Feb. 13, 2020, which claims priority to U.S. Provisional Patent Application No. 62/806,514 filed on Feb. 15, 2019, entitled "Methods of HARQ Codebook Determination for Low Latency Communications," the entire disclosures of which are hereby incorporated by reference.

TECHNICAL FIELD

The present disclosure relates, in general, to wireless communications and, more particularly, to methods of HARQ codebook determination for low latency communications.

BACKGROUND

The new radio (NR) standard, as specified by the Third Generation Partnership Project (3GPP), is designed to provide service for multiple use cases such as enhanced mobile broadband (eMBB), ultra-reliable and low latency communication (URLLC), and machine type communication (MTC). Each of these services has different technical requirements. For example, the general requirement for eMBB is a high data rate with moderate latency and moderate coverage, while URLLC service requires a low latency and high reliability transmission but perhaps only moderate data rates.

FIG. 1 illustrates an example of the radio resources available in NR. One of the solutions for low latency data transmission is to use shorter transmission time intervals. In NR, in addition to transmission in a slot, transmission in a mini-slot is also allowed to reduce latency. A mini-slot is a concept that is used in scheduling. In the downlink (DL), a mini-slot can consist of 2, 4, or 7 orthogonal frequency-division multiplexing (OFDM) symbols. In the uplink (UL), a mini-slot can be any number of 1 to 14 OFDM symbols. It should be noted that the concepts of slot and mini-slot are not specific to a given service. Accordingly, a mini-slot may be used for either eMBB, URLLC, or other services.

Downlink Control Information

In the 3GPP NR standard, downlink control information (DCI) transmitted in a physical downlink control channel (PDCCH) is used to indicate DL data related information, UL related information, power control information, slot format information, etc. Each of these control signals is associated with a different format of downlink control information. The user equipment (UE) identifies the format based on different radio network temporary identifiers (RNTIs).

A UE is configured by higher layer signalling to monitor for DCIs in different resources with different periodicities, etc. DCI formats 1_0 and 1_1 are used for scheduling DL data which is sent in physical downlink shared channel (PDSCH), and include time and frequency resources for DL transmission, as well as modulation and coding information, HARQ (hybrid automatic repeat request) information, etc.

HARQ Feedback

The procedure by which a UE receives downlink transmissions is as follows. The UE first monitors and decodes a PDCCH in slot n which points to DL data scheduled in slot n+$K_0$ slots (where $K_0$ is larger than or equal to 0). The UE then decodes the data in the corresponding PDSCH. Finally, based on the outcome of the decoding, the UE sends an acknowledgement of the correct decoding (ACK) or a negative acknowledgement (NACK) to the NR base station (gNB) in time slot n+$K_1$. Both $K_0$ and $K_1$ are indicated in the downlink DCI. The resources for sending the acknowledgement are indicated by the acknowledgement resource indicator (ARI) field in the PDCCH, which points to one of the physical uplink control channel (PUCCH) resources that is configured by higher layers. Depending on DL/UL slot configurations, or whether carrier aggregation, or per codeblock group (CBG) transmission is used in the DL, the feedback for several PDSCHs may need to be multiplexed in one feedback. This is done by constructing HARQ-ACK codebooks.

In NR, the UE can be configured to multiplex the A/N bits using a semi-static codebook or a dynamic codebook. The semi-static codebook consists of a matrix where each element contains the ACK/NACK bit from a transport block (TB) or a CBG retransmission in a certain slot, carrier, or multiple-input multiple-output (MIMO) layer. The drawback of using a semi-static HARQ-ACK codebook is that the size is fixed and, regardless of whether there is a transmission or not, a bit is reserved in the feedback matrix.

To avoid reserving unnecessary bits in a semi-static HARQ codebook, in NR, a UE can be configured to use a dynamic HARQ codebook, where an ACK/NACK bit is present only if there is a corresponding transmission. To avoid any confusion between the gNB and the UE on the number of PDSCHs that the UE has to send feedback for, a counter downlink assignment indicator (DAI) field exists in the DL assignment, which denotes a cumulative number of {serving cell, PDCCH occasion} pairs in which a PDSCH is scheduled for a UE up to the current PDCCH. In addition, there is field called total DAI that, when present, shows the total number of {serving cell, PDCCH occasion} pairs. The timing for sending HARQ feedback is determined based on both the PDSCH transmission slot with reference to the PDCCH slot ($K_0$) and the PUCCH that contains HARQ feedback ($K_1$).

FIG. 2 illustrates the timeline in a simple scenario with two PDSCHs and one feedback. In the example of FIG. 2, a total of 4 PUCCH resources are configured, and the ARI indicates to use PUCCH 2 for HARQ feedback.

SUMMARY

There currently exist certain challenge(s). For example, NR is designed to address a variety of different traffic types and applications with varying requirements. It has been decided that for low latency communication services, multiple PUCCHs within a slot are supported to allow faster HARQ feedback based on multiple HARQ ACK codebook per slot. However, the resources for PUCCH are specified based on the ARI in the latest DL assignment, which is based on slots. The current design does not enable differentiation between the PUCCHs in the different "fractional" slots. Therefore, the current design does not provide the resources within one slot for sending multiple HARQ PUCCH. FIG. 3 shows one example of a case where two HARQ codebook transmission is not enabled in a slot because the ARI in the latest DCI is used for feedback of both PDSCH 1 and PDSCH 2.

Certain aspects of the present disclosure and their embodiments may provide solutions to these or other challenges. For example, in certain embodiments, a group of downlink channel sub-slots for downlink channel transmissions and a corresponding group of uplink channel sub-slots for uplink channel transmissions may be determined, based on the DCI. As an example, the group of downlink channel sub-slots may be explicitly signalled in the DCI, or implicitly determined, based on the DCI. As another example, the group of uplink channel sub-slots may be explicitly signalled in the DCI, or implicitly determined, based on the DCI. In some embodiments, the length of the group of the downlink channel sub-slots is the same as the length of the group of the uplink channel sub-slots. In some embodiments, the length of the group of downlink channel sub-slots is different from the length of the group of uplink channel sub-slots. In certain embodiments, the group of downlink channel sub-slots includes a downlink slot.

The first group of downlink channel sub-slots is associated with one or more uplink resources in the corresponding group of uplink channel sub-slots. Accordingly, a first HARQ codebook comprising ACK/NACK feedback for the downlink channel transmissions scheduled in the first group of downlink channel sub-slots may be constructed and transmitted using the one or more uplink resources.

In certain embodiments, HARQ ACK codebooks (PUCCHs) within a slot are associated to PDSCHs based on the position of PDSCHs in a slot. There are, proposed herein, various embodiments which address one or more of the issues disclosed herein.

According to certain embodiments, a method performed by a wireless device includes receiving, from a network node, downlink control information (DCI). The method also includes determining, based on the DCI, a first group of downlink channel sub-slots for downlink channel transmissions. The first group of downlink channel sub-slots corresponds to a group of uplink channel sub-slots and is associated with one or more uplink resources in the corresponding group of uplink channel sub-slots. The method additionally includes constructing a first HARQ codebook comprising acknowledgment (ACK) and/or negative acknowledgement (NACK) feedback for the downlink channel transmissions scheduled in the first group of downlink channel sub-slots. The method further includes transmitting the ACK and/or NACK feedback, using the one or more uplink resources, according to the first HARQ codebook.

According to certain embodiments, a wireless device includes power supply circuitry and processing circuitry. The power supply circuitry is configured to supply power to the wireless device. The processing circuitry is configured to receive, from a network node, downlink control information (DCI). The processing circuitry is also configured to determine, based on the DCI, a first group of downlink channel sub-slots for downlink channel transmissions. The first group of downlink channel sub-slots corresponds to a group of uplink channel sub-slots and is associated with one or more uplink resources in the corresponding group of uplink channel sub-slots. The processing circuitry is additionally configured to construct a first HARQ codebook comprising acknowledgement (ACK) and/or negative acknowledgements (NACK) feedback for the downlink channel transmissions scheduled in the first group of downlink channel sub-slots. The processing circuitry is further configured to transmit the ACK and/or NACK feedback, using the one or more uplink resources, according to the first HARQ codebook.

According to certain embodiments, a computer program includes instructions that, when executed on a computer, cause the computer to perform a method including receiving from a network node, downlink control information (DCI). The method also includes determining, based on the DCI, a first group of downlink channel sub-slots for downlink channel transmissions. The first group of downlink channel sub-slots corresponds to a group of uplink channel sub-slots and is associated with one or more uplink resources in the corresponding group of uplink channel sub-slots. The method additionally includes constructing a first HARQ codebook comprising acknowledgment (ACK) and/or negative acknowledgement (NACK) feedback for the downlink channel transmissions scheduled in the first group of downlink channel sub-slots. The method further includes transmitting the ACK and/or NACK feedback, using the one or more uplink resources, according to the first HARQ codebook.

Each of the above-described method, wireless device, and computer program may include one or more additional features. For example, the method, wireless device, and/or computer program may include one or more of the following features:

In certain embodiments, the first group of downlink channel sub-slots includes a downlink channel slot.

In certain embodiments, different physical downlink shared channels (PDSCHs) belong to the first group of downlink channel sub-slots.

In certain embodiments, the one or more uplink resources comprise physical uplink control channel (PUCCH) resources.

In certain embodiments, the wireless device additionally receives, from the network node, additional DCI. The wireless device also determines, based on the additional DCI, a second group of downlink channel sub-slots for downlink channel transmissions. The second group of downlink channel sub-slots correspond to a second group of uplink channel sub-slots and is associated with one or more uplink resources in the corresponding second group of uplink channel sub-slots. The wireless device further constructs a second HARQ codebook comprising ACK and/or NACK feedback for the downlink channel transmissions scheduled in the second group of downlink channel sub-slots. The wireless device additionally transmits the ACK and/or NACK feedback, using the one or more uplink resources associated with the second group of downlink channel sub-slots, according to the second HARQ codebook. In some such embodiments, the first group of downlink channel sub-slots and the second group of downlink channel sub-slots correspond to the same downlink slot and the one or more uplink resources of the first HARQ codebook are different than the one or more uplink resources of the second HARQ codebook.

In certain embodiments, the first group of downlink channel sub-slots is determined from a plurality of groups of downlink channel sub-slots, each group of downlink channel sub-slots associated with a respective group of sub-slots of downlink slots.

In certain embodiments, the DCI schedules downlink transmissions in the first group of downlink channel sub-slots, each sub-slot of the first group is associated with its own DCI, and the wireless device further determines the one or more uplink resources based at least in part on a DCI associated with the last scheduled sub-slot of the first group of downlink channel sub-slots. In some such embodiments, the DCI associated with the last scheduled sub-slot of the first group is a most recently received DCI. In some such embodiments, the one or more uplink resources comprise PUCCH resources indicated by an acknowledgement resource indicator (ARI) field in the latest DCI.

According to certain embodiments, a method performed by a network node includes sending a wireless device downlink control information (DCI). The DCI includes information associated with a first group of downlink channel sub-slots for downlink channel transmissions. The first group of downlink channel sub-slots corresponds to a group of uplink channel sub-slots. The method also includes determining one or more uplink resources in the corresponding group of uplink channel sub-slots. The one or more uplink resources are associated with a first HARQ codebook comprising acknowledgment (ACK) and/or negative acknowledgement (NACK) feedback for the downlink channel transmissions scheduled in the first group of downlink channel sub-slots. The method additionally includes receiving the ACK and/or NACK feedback according to the first HARQ codebook.

According to certain embodiments, a network node includes power supply circuitry and processing circuitry. The power supply circuitry is configured to supply power to the network node. The processing circuitry is configured to send a wireless device downlink control information (DCI). The DCI includes information associated with a first group of downlink channel sub-slots for downlink channel transmissions. The first group of downlink channel sub-slots corresponds to a group of uplink channel sub-slots. The processing circuitry is also configured to determine one or more uplink resources in the corresponding group of uplink channel sub-slots. The one or more uplink resources are associated with a first HARQ codebook comprising acknowledgment (ACK) and/or negative acknowledgement (NACK) feedback for the downlink channel transmissions scheduled in the first group of downlink channel sub-slots. The processing circuitry is additionally configured to receive the ACK and/or NACK feedback according to the first HARQ codebook.

According to certain embodiments, a computer program includes instructions that, when executed on a computer, cause the computer to perform a method including sending a wireless device downlink control information (DCI). The DCI includes information associated with a first group of downlink channel sub-slots for downlink channel transmissions. The first group of downlink channel sub-slots corresponds to a group of uplink channel sub-slots. The method also includes determining one or more uplink resources in the corresponding group of uplink channel sub-slots. The one or more uplink resources are associated with a first HARQ codebook comprising acknowledgment (ACK) and/or negative acknowledgement (NACK) feedback for the downlink channel transmissions scheduled in the first group of downlink channel sub-slots. The method additionally includes receiving the ACK and/or NACK feedback according to the first HARQ codebook.

Each of the above-described method, network node, and computer program may include one or more additional features. For example, the method, network node, and/or computer program may include one or more of the following features:

In certain embodiments, the first group of downlink channel sub-slots comprises a downlink channel slot.

In certain embodiments, different physical downlink shared channels (PDSCHs) belong to the first group of downlink channel sub-slots.

In certain embodiments, the one or more uplink resources comprise physical uplink control channel (PUCCH) resources.

In certain embodiments, the network node is further configured to send the wireless device additional DCI. The additional DCI includes information associated with a second group of downlink channel sub-slots for downlink channel transmissions. The second group of downlink channel sub-slots correspond to a second group of uplink channel sub-slots. The network node is additionally configured to determine one or more uplink resources in the corresponding second group of uplink channel sub-slots. The one or more uplink resources are associated with a second HARQ codebook comprising acknowledgment (ACK) and/or negative acknowledgement (NACK) feedback for the downlink channel transmissions scheduled in the second group of downlink channel sub-slots. The network node is further configured to receive the ACK and/or NACK feedback according to the second HARQ codebook. In some such embodiments, the first group of downlink channel sub-slots and the second group of downlink channel sub-slots correspond to the same downlink slot and the one or more uplink resources of the first HARQ codebook are different than the one or more uplink resources of the second HARQ codebook.

In certain embodiments, the first group of downlink channel sub-slots is determined from a plurality of groups of downlink channel sub-slots, each group of downlink channel sub-slots associated with a respective group of sub-slots of downlink slots.

In certain embodiments, the DCI schedules downlink transmissions in the first group of downlink channel sub-slots, each sub-slot of the first group is associated with its own DCI, and the network node is further configured to determine the one or more uplink resources based at least in part on a latest DCI associated with the last scheduled sub-slot of the first group of downlink channel sub-slots. In some such embodiments, the one or more uplink resources comprise PUCCH resources indicated by an acknowledgement resource indicator (ARI) field in the latest DCI.

Certain embodiments may provide one or more of the following technical advantage(s). A technical advantage of certain embodiments makes it possible to send HARQ ACK/NACK feedback with low latency and, in particular, enable association between multiple PDSCHs and PUCCHs.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to certain embodiments, UL slots are divided into multiple groups of sub-slots. The groups of uplink channel sub-slots may be explicitly signalled from the network node, or implicitly determined by the UE. The UE may determine a group of downlink channel sub-slots corresponding to the group of uplink channel sub-slots. This disclosure contemplates that an UL sub-slot includes any number of 1 to 14 OFDM symbols, and a DL sub-slot includes 2, 4, or 7 OFDM symbols. The UE may then construct a HARQ codebook comprising HARQ feedback for the downlink channel transmissions scheduled in the group of downlink channel sub-slots, and transmit the HARQ feedback, using one or more uplink resources associated with the group of uplink channel sub-slots.

Figure 1:
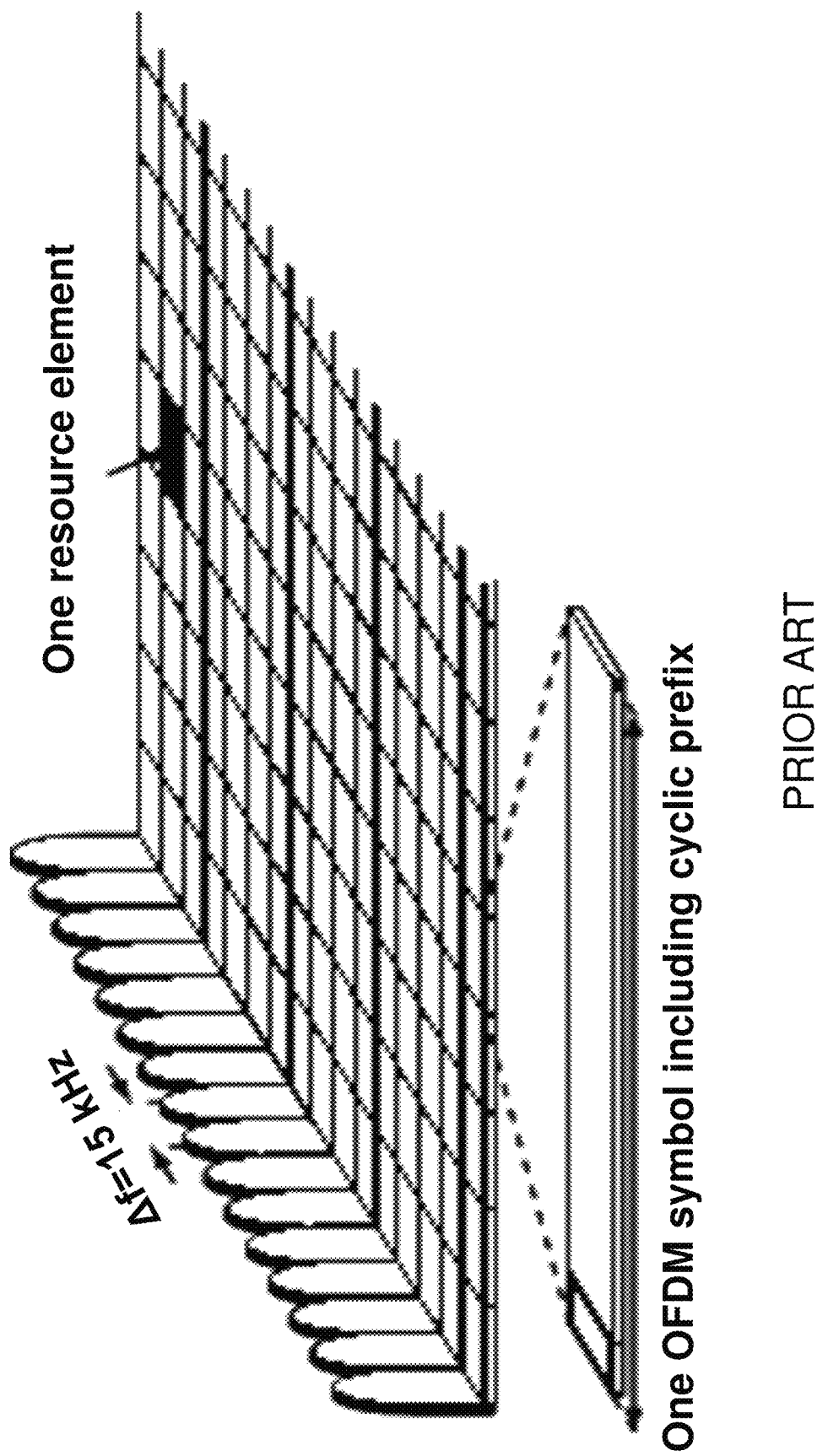
FIG. 1 presents an exemplary radio resource in NR.
Figure 2:
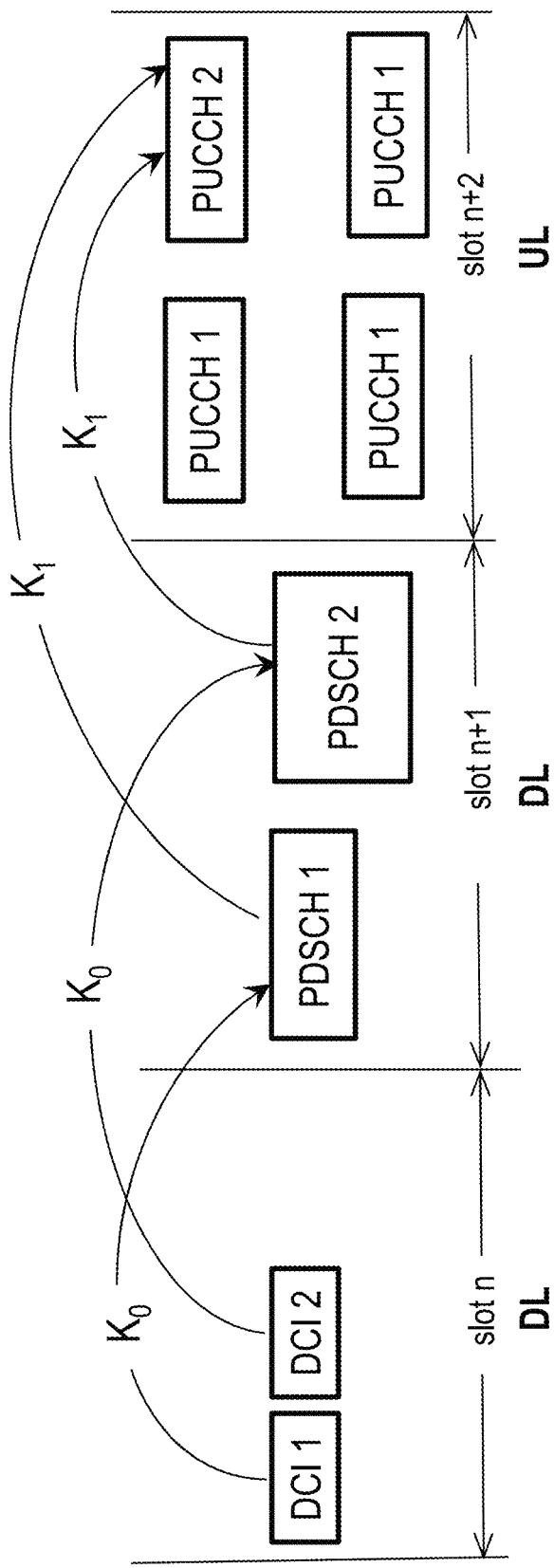
FIG. 2 presents an example transmission timeline for a scenario with two PDSCHs and one feedback.
Figure 3:
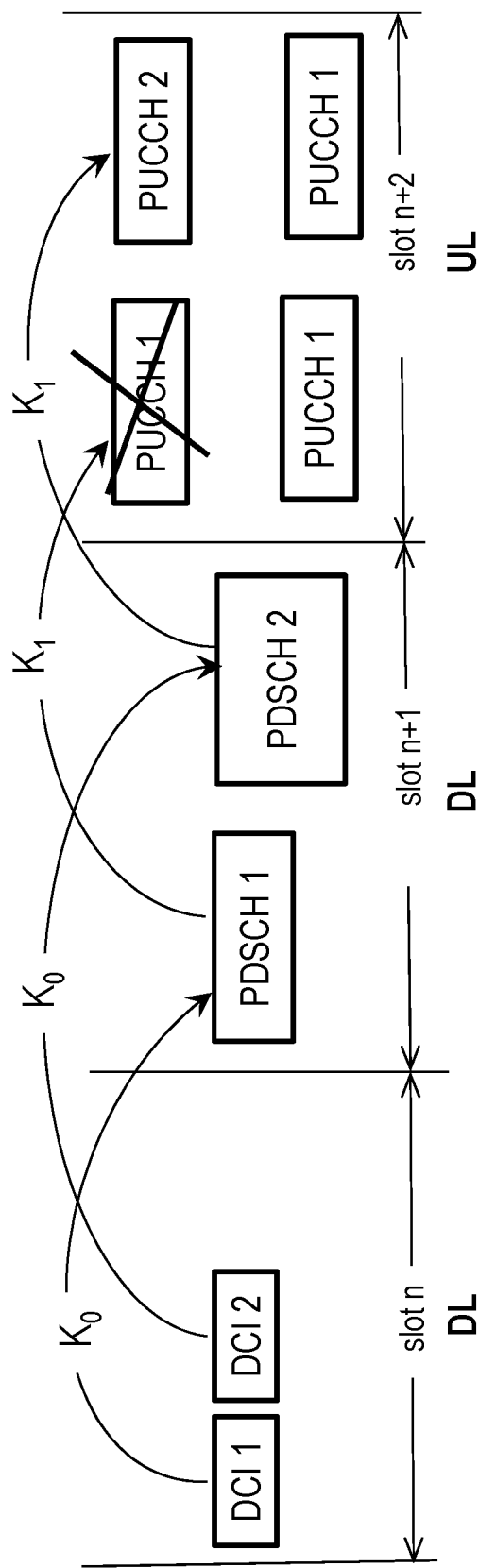
FIG. 3 presents an example of a case where it is not possible to send HARQ feedback for two pieces of data in one slot.
Figure 4:
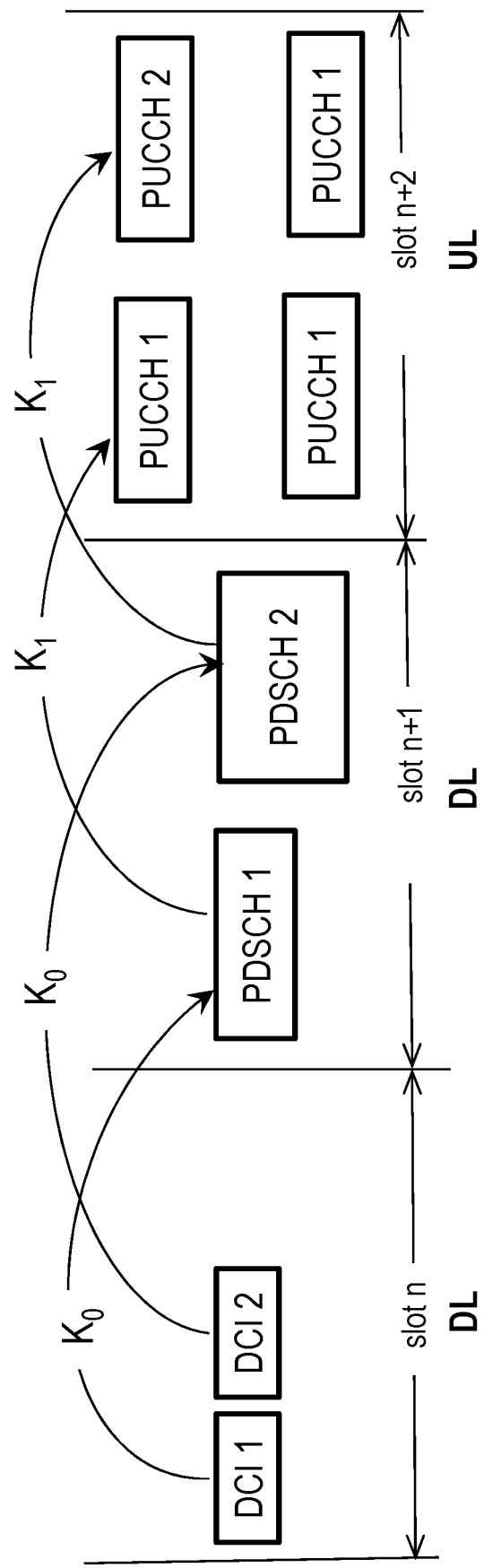
FIG. 4 presents an example method for transmitting multiple HARQ codebooks in one slot corresponding to different PDSCH groups, in accordance with certain embodiments.

According to certain embodiments, DL slots are divided into multiple groups of sub-slots (either explicitly indicated or implicitly determined, for example, by processing time of the UE). Then different PDSCHs that belong to one group of sub-slots are grouped together. HARQ codebooks are constructed for each such group. The latest DCI that corresponds to each PDSCH group indicates the ARI for the feedback of the group. Each sub-slot has its own "latest DCI" which is the last DCI that schedules a PDSCH in the sub-slot. The ARI of the latest DCI is then used to determine the PUCCH resource to be used for transmission of the HARQ codebook containing HARQ ACK feedback of the PDSCH in the sub-slot. FIG. 4 illustrates the concept in a simple setup.

Figure 5:
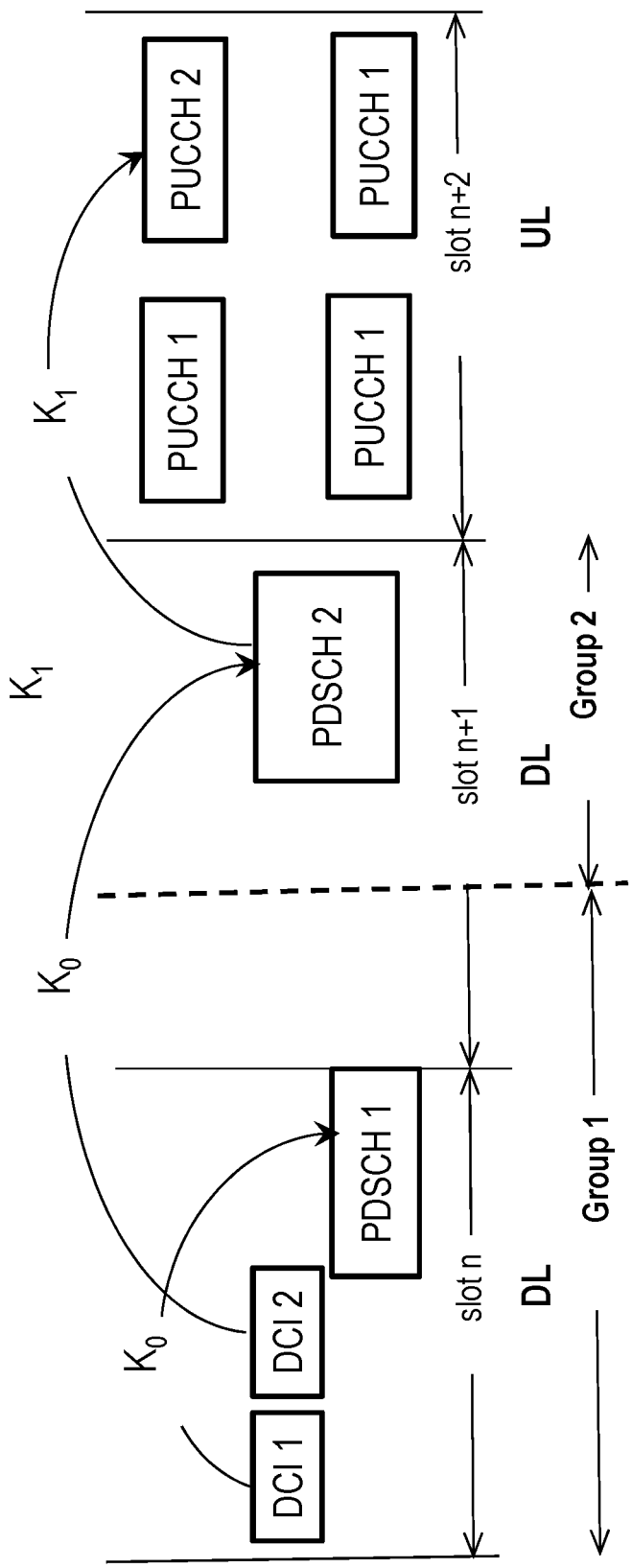
FIG. 5 presents an example of grouping DL slots and sub-slots for HARQ feedback, in accordance with certain embodiments.

The idea of splitting slots into groups of sub-slots can be extended to divide DL slots into multiple groups of slots and sub-slots. For example, a group of sub-slots may include a DL slot. In a similar manner, different PDSCHs that belong to one group are grouped together. HARQ codebooks are constructed for each such group. The latest DCI that corresponds to each PDSCH group indicates the ARI for the feedback of the group. FIG. 5 illustrates grouping based on slots and sub-slots.

In NR Rel-15 the dynamic HARQ codebook is constructed by first determining a set of PDCCH monitoring occasions for the current PUCCH. The set of PDCCH monitoring occasions are all those potential PDCCH monitoring occasions that can schedule PDSCH for which HARQ feedback would be transmitted on the current PUCCH. For this purpose, the UE uses the set of configured $K_1$ values (to trace back from PUCCH slot to PDSCH slots) and the set of configured $K_0$ values (to trace back from PDSCH slots to PDCCH slots). All detected PDCCH carrying DL assignments in the set of PDCCH monitoring occasions—or the PDSCH scheduled by those PDCCH—are being acknowledged in the HARQ codebook of the current PUCCH (the HARQ association set).

Certain embodiments of the present disclosure now propose to consider the time-domain resource allocation within a slot (given by the DCI) to determine into which sub-slot a scheduled PDSCH falls and, by that, in which PUCCH sub-slot the HARQ feedback should be sent. The HARQ association set is thus determined by a set of configured $K_0$ and $K_1$ values (similar to Rel-15) plus the time-domain resource allocation within the slot. For example, assuming this idea is applied on top of the Rel-15 dynamic HARQ codebook, the UE determines the set of PDCCH monitoring occasions as in Rel-15, in a first step. In a second step, the PDSCH time-domain resource allocation contained in the DCI of a detected PDCCH is inspected and, based on the time-domain resource allocation, the PUCCH sub-slot is determined. The latest DCI scheduling a PDSCH that should be acknowledged in a PUCCH sub-slot determines the exact PUCCH resource in the sub-slot via the contained ACK/NACK Resource Indicator.

Figure 6:
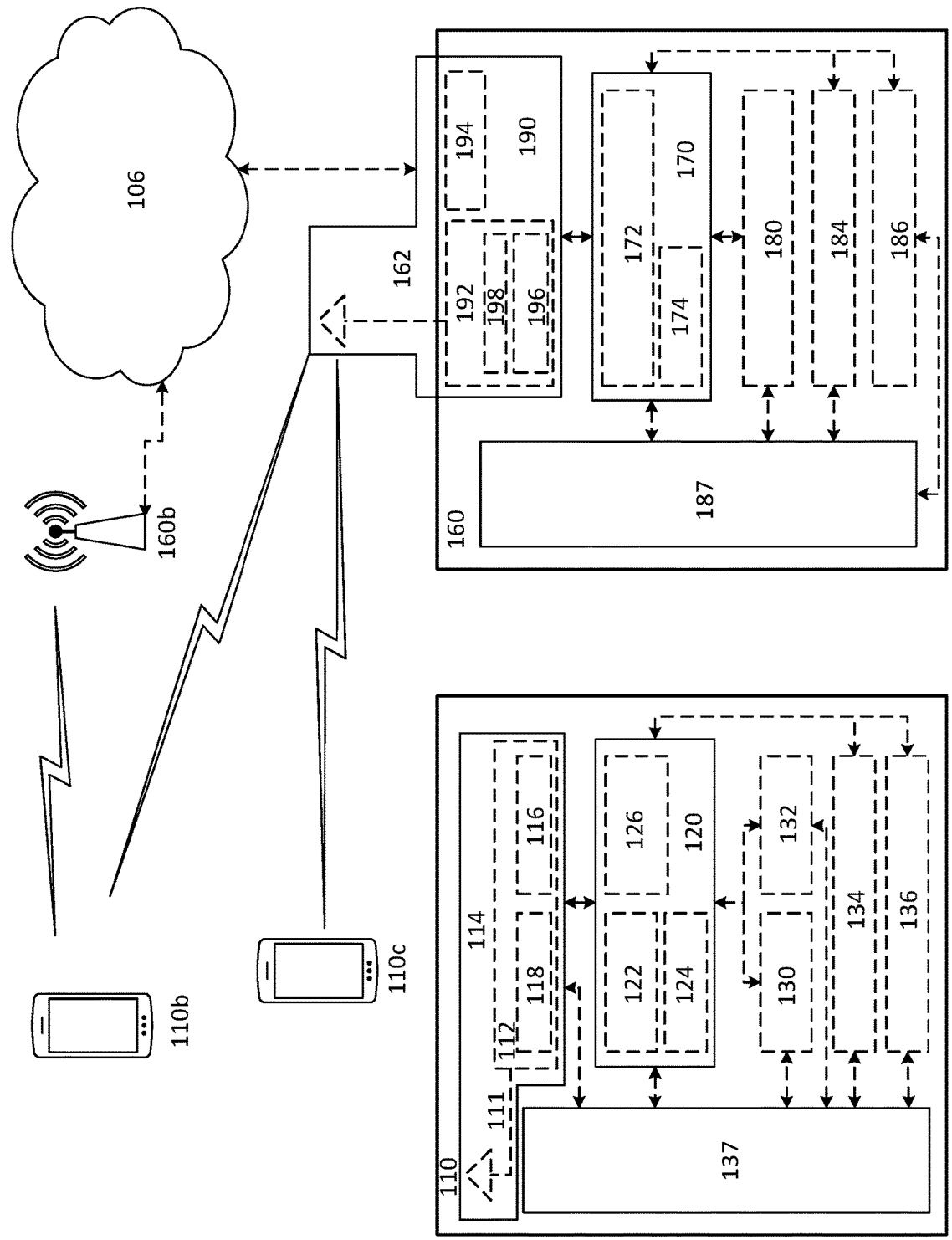
FIG. 6 is an illustration of an exemplary wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170.

Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
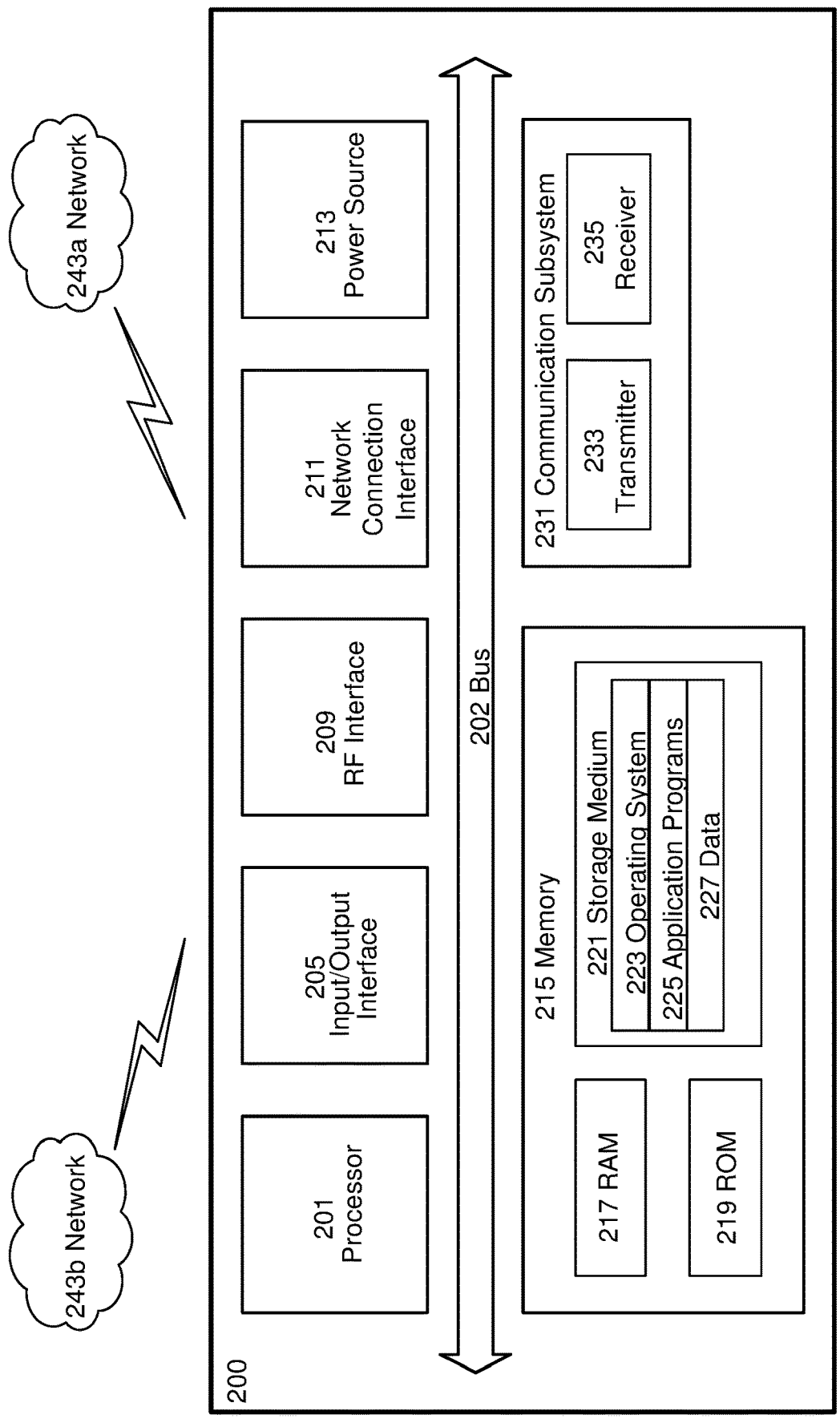
FIG. 7 is an illustration of an exemplary user equipment, in accordance with certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
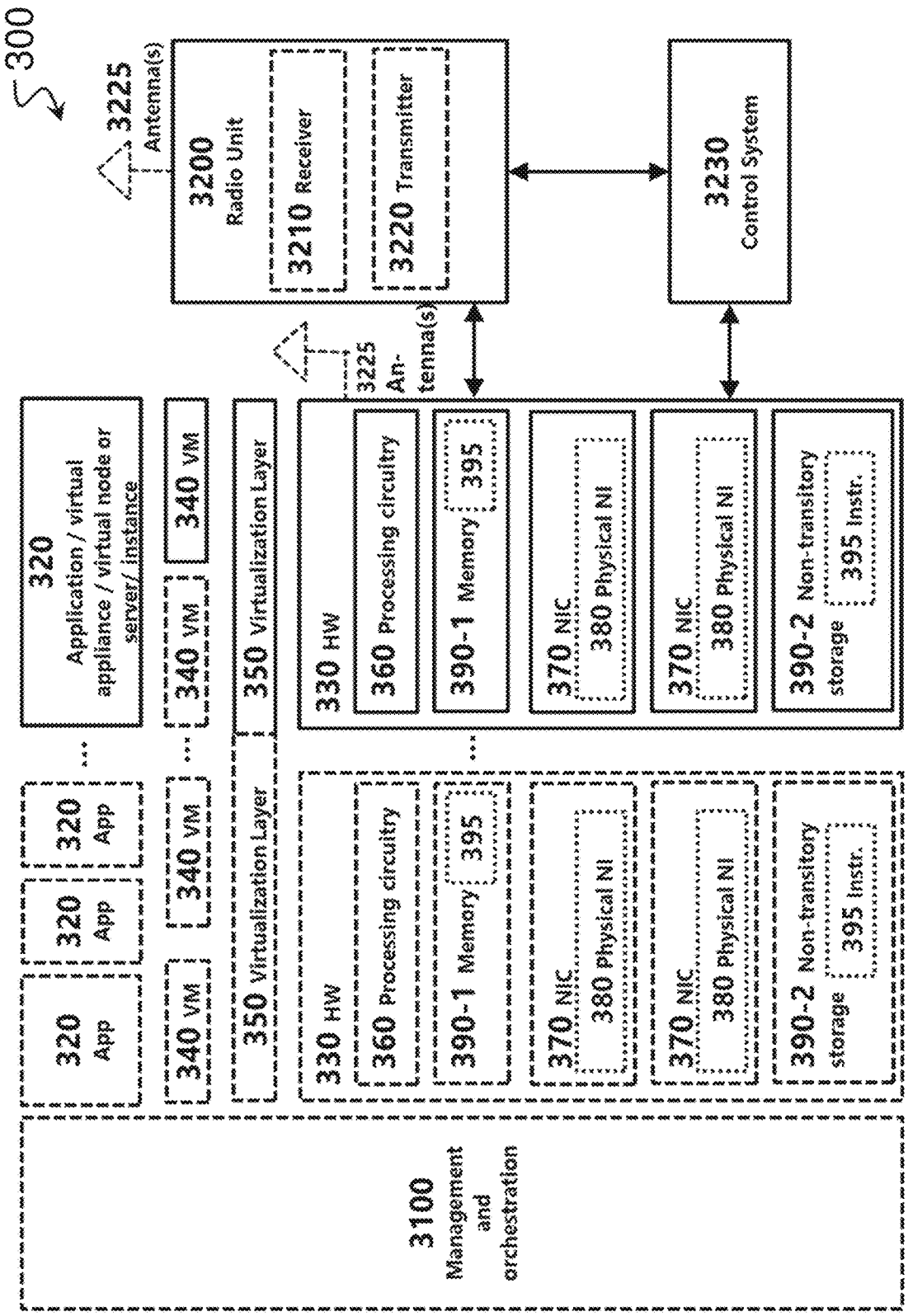
FIG. 8 is an illustration of an exemplary virtualization environment, in accordance with certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
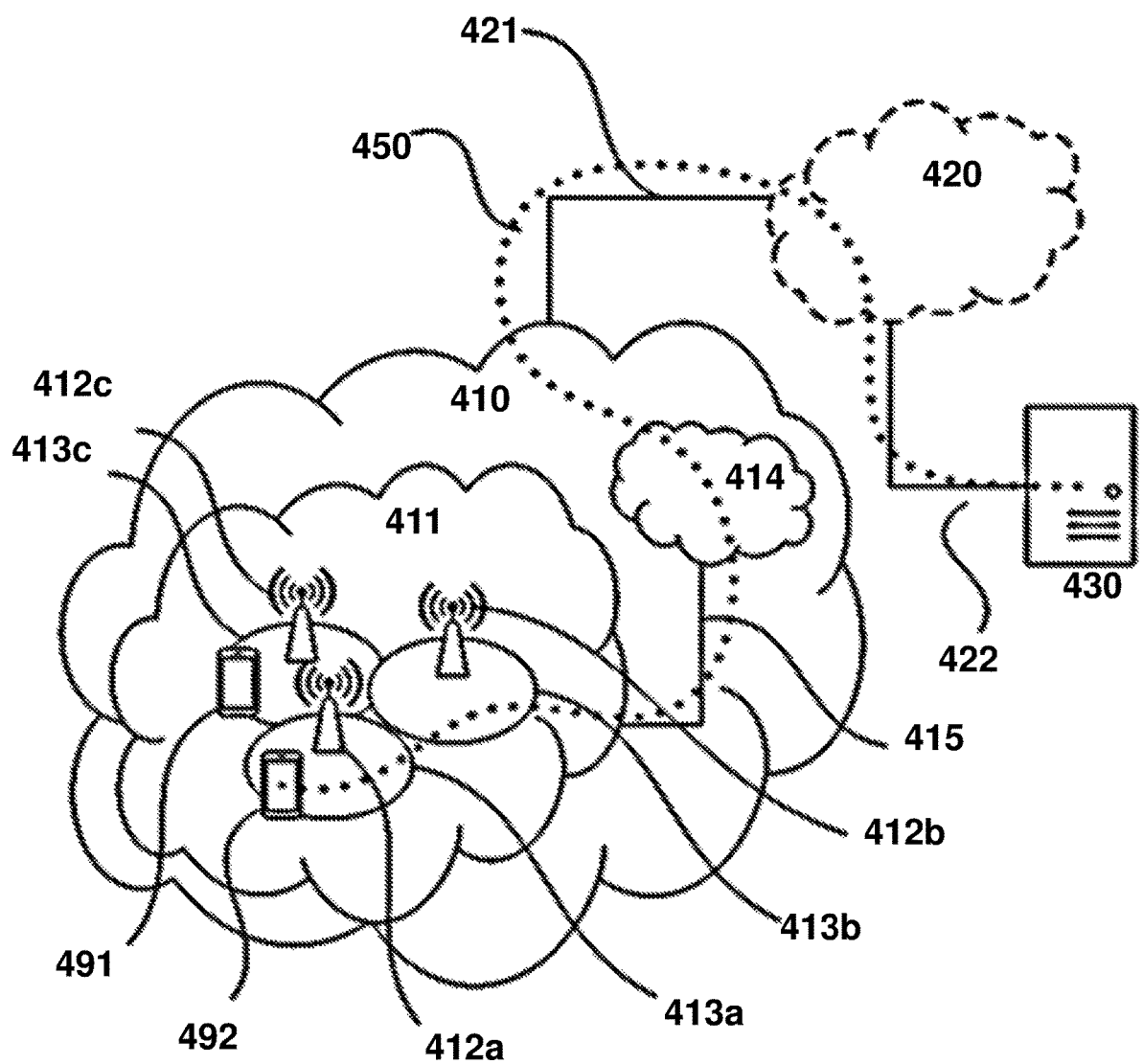
FIG. 9 is an illustration of an exemplary telecommunication network connected via an intermediate network to a host computer in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 10:
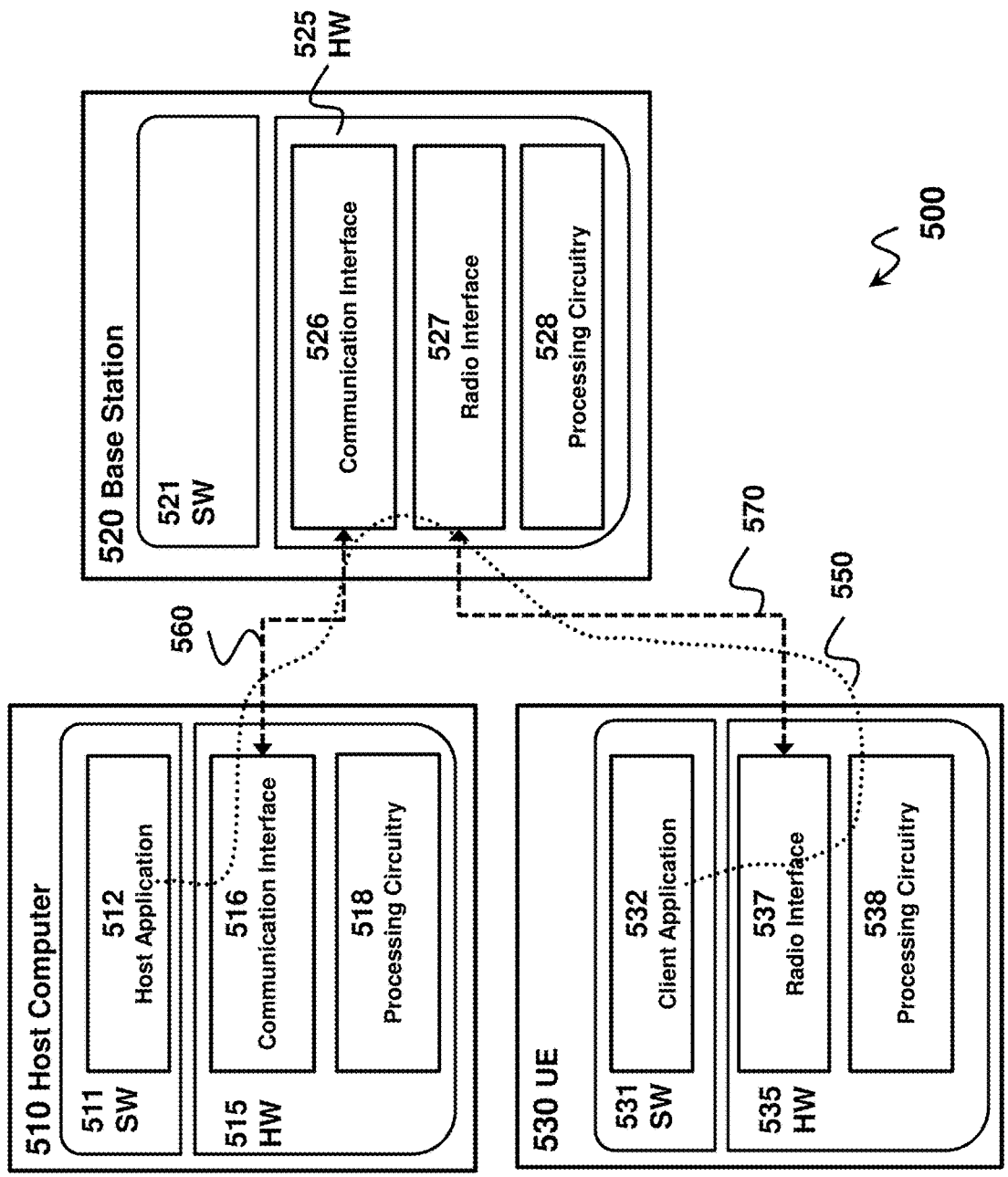
FIG. 10 is an illustration of an exemplary host computer communicating via a base station with a user equipment over a partially wireless connection, in accordance with certain embodiments.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and thereby provide benefits such as reduced user waiting times.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
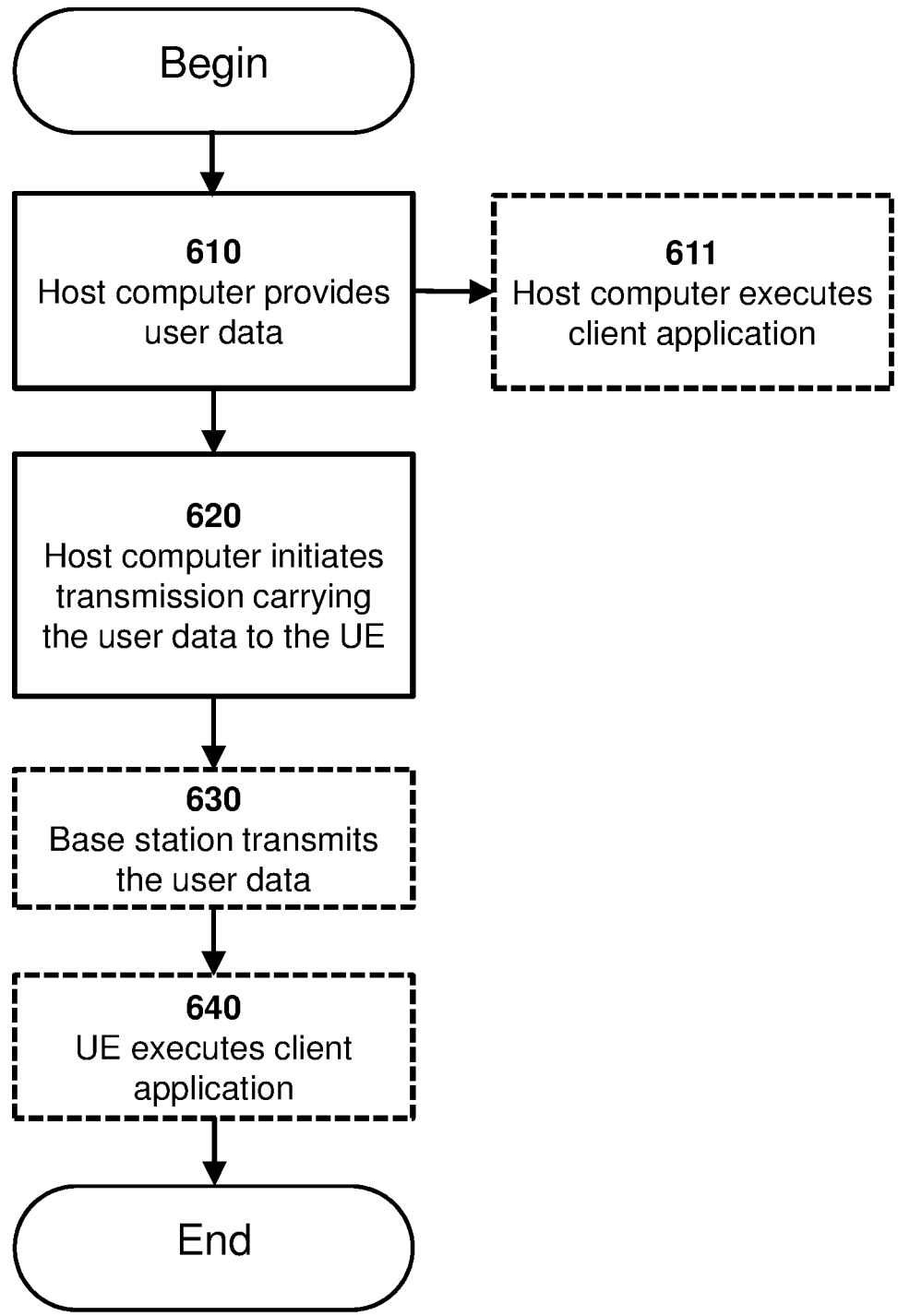
FIGS. 11-14 are flowcharts showing exemplary methods implemented in a communication system including a host computer, a base station, and a user equipment, in accordance with certain embodiments.

FIG. 11 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
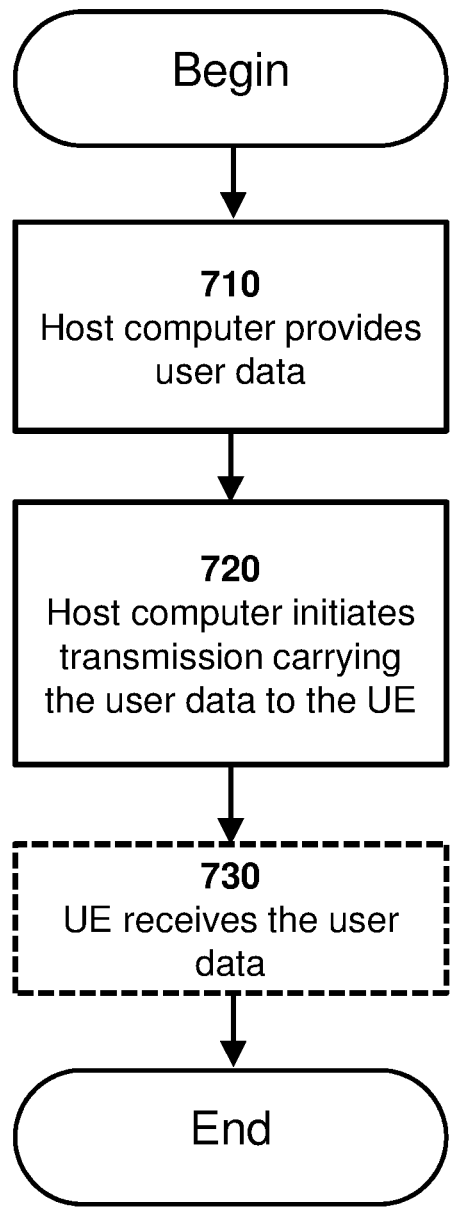

FIG. 12 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
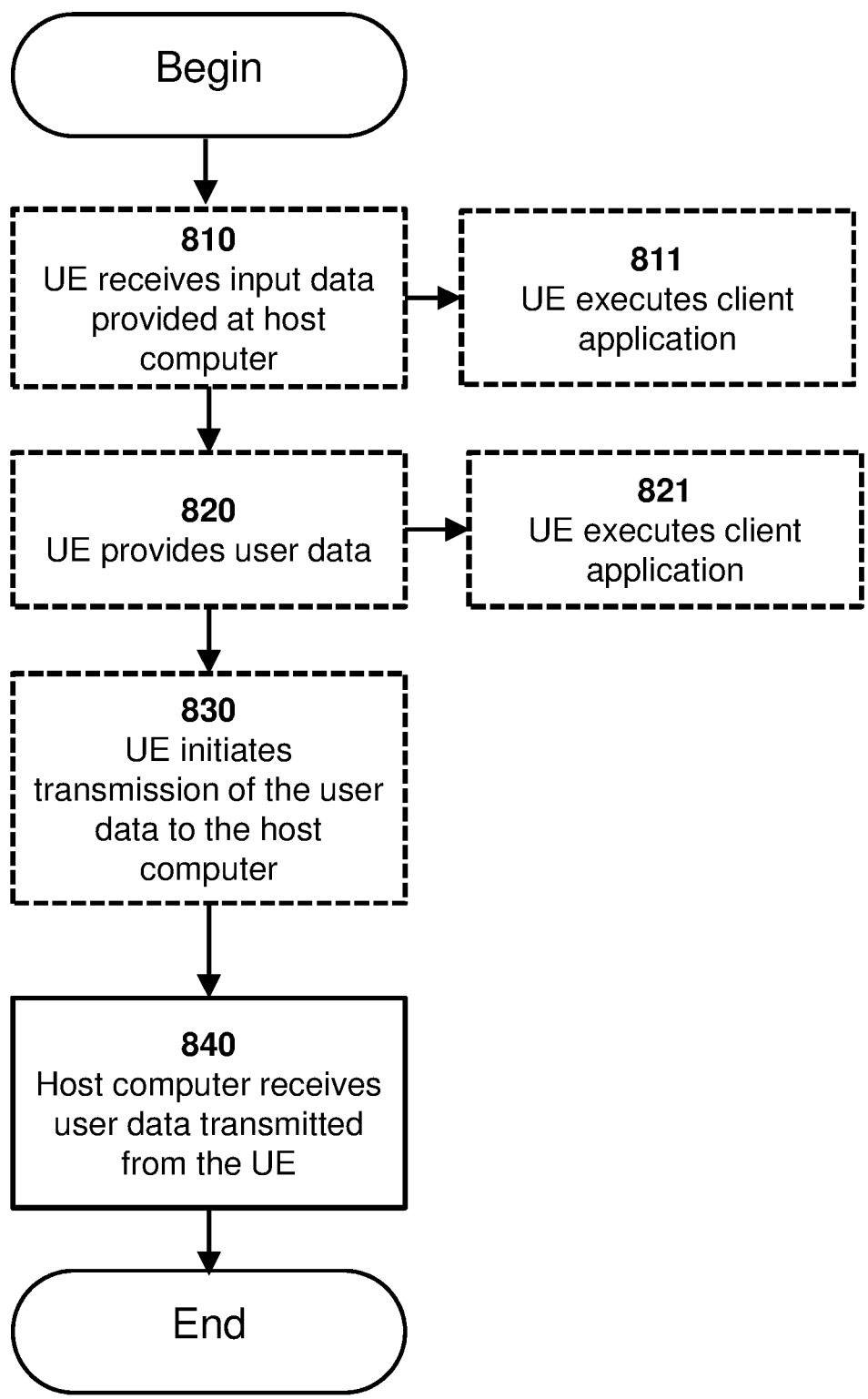

FIG. 13 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
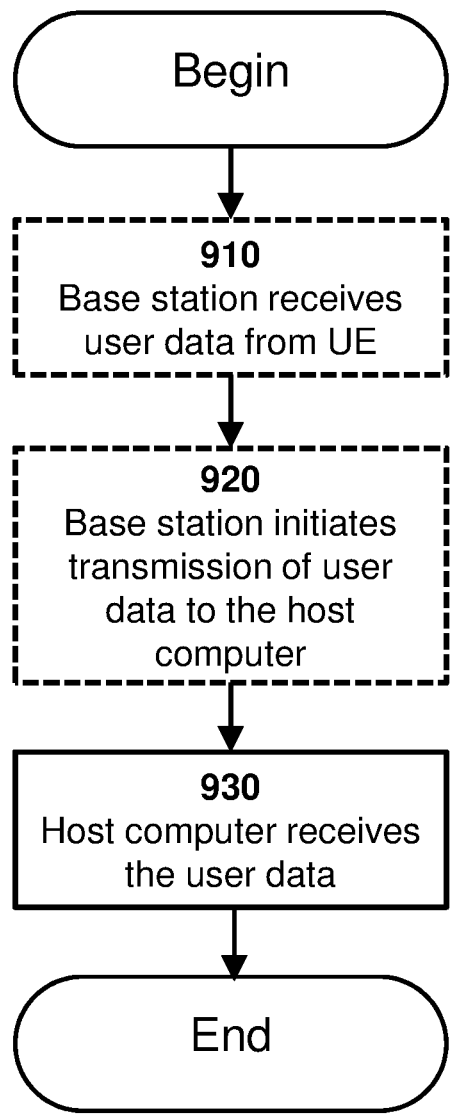

FIG. 14 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
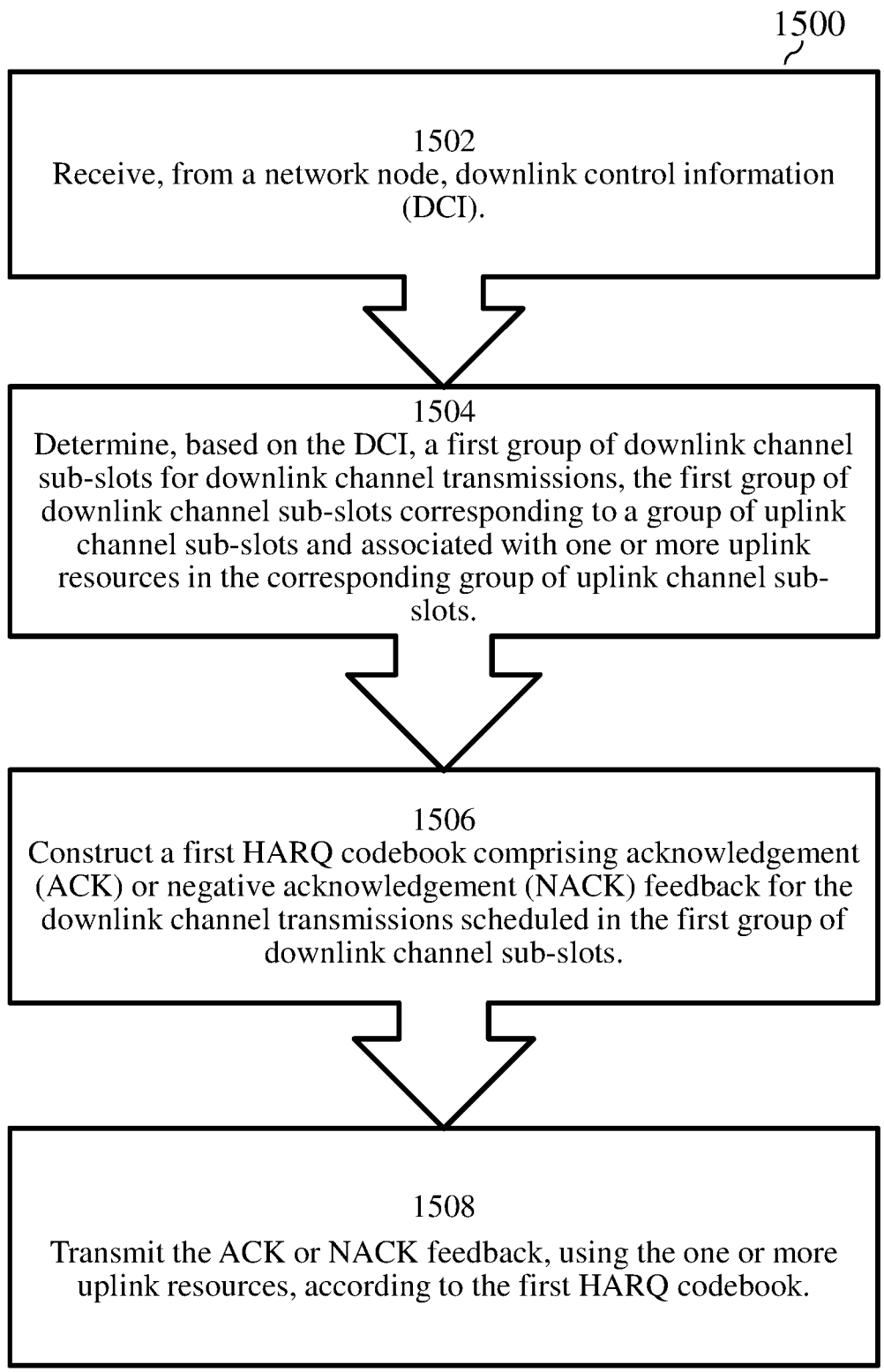
FIGS. 15-18 are flowcharts showing exemplary methods implemented in a communication system including a wireless device and a network node, in accordance with certain embodiments.

FIG. 15 depicts a method 1500 in accordance with certain embodiments. The method may be performed by a wireless device, such as a UE, examples of which are described above. The method 1500 begins at step 1502 with receiving, from a network node, downlink control information (DCI). The method proceeds to step 1504 with determining, based on the DCI, a first group of downlink channel sub-slots for downlink channel transmissions. The first group of downlink channel sub-slots corresponds to a group of uplink channel sub-slots and is associated with one or more uplink resources in the corresponding group of uplink channel sub-slots. In certain embodiments, the first group of downlink channel sub-slots includes a downlink channel slot. In some embodiments, the length of the downlink channel sub-slots is different from the length of the uplink channel sub-slots. In certain embodiments, different physical downlink shared channels (PDSCHs) belong to the first group of downlink channel sub-slots. In some embodiments, the one or more uplink resources include physical uplink control channel (PUCCH) resources.

In step 1506 the method includes constructing a first HARQ codebook comprising acknowledgement (ACK) and/or negative acknowledgement (NACK) feedback for the downlink channel transmissions scheduled in the first group of downlink channel sub-slots. The method continues to step 1508 with transmitting the ACK and/or NACK feedback, using the one or more uplink resources, according to the first HARQ codebook.

In certain embodiments, the method additionally includes receiving, from the network node, additional DCI. The method also includes determining, based on the additional DCI, a second group of downlink channel sub-slots for downlink channel transmissions. The second group of downlink channel sub-slots corresponds to a second group of uplink channel sub-slots and is associated with one or more uplink resources in the corresponding second group of uplink channel sub-slots. The method additionally includes constructing a second HARQ codebook comprising ACK and/or NACK feedback for the downlink channel transmissions scheduled in the second group of downlink channel sub-slots. The method further includes transmitting the ACK and/or NACK feedback, using the one or more uplink resources associated with the second group of downlink channel sub-slots, according to the second HARQ codebook. In some such embodiments, the first group of downlink channel sub-slots and the second group of downlink channel sub-slots correspond to the same downlink slot and the one or more uplink resources of the first HARQ codebook are different than the one or more uplink resources of the second HARQ codebook.

Figure 16:
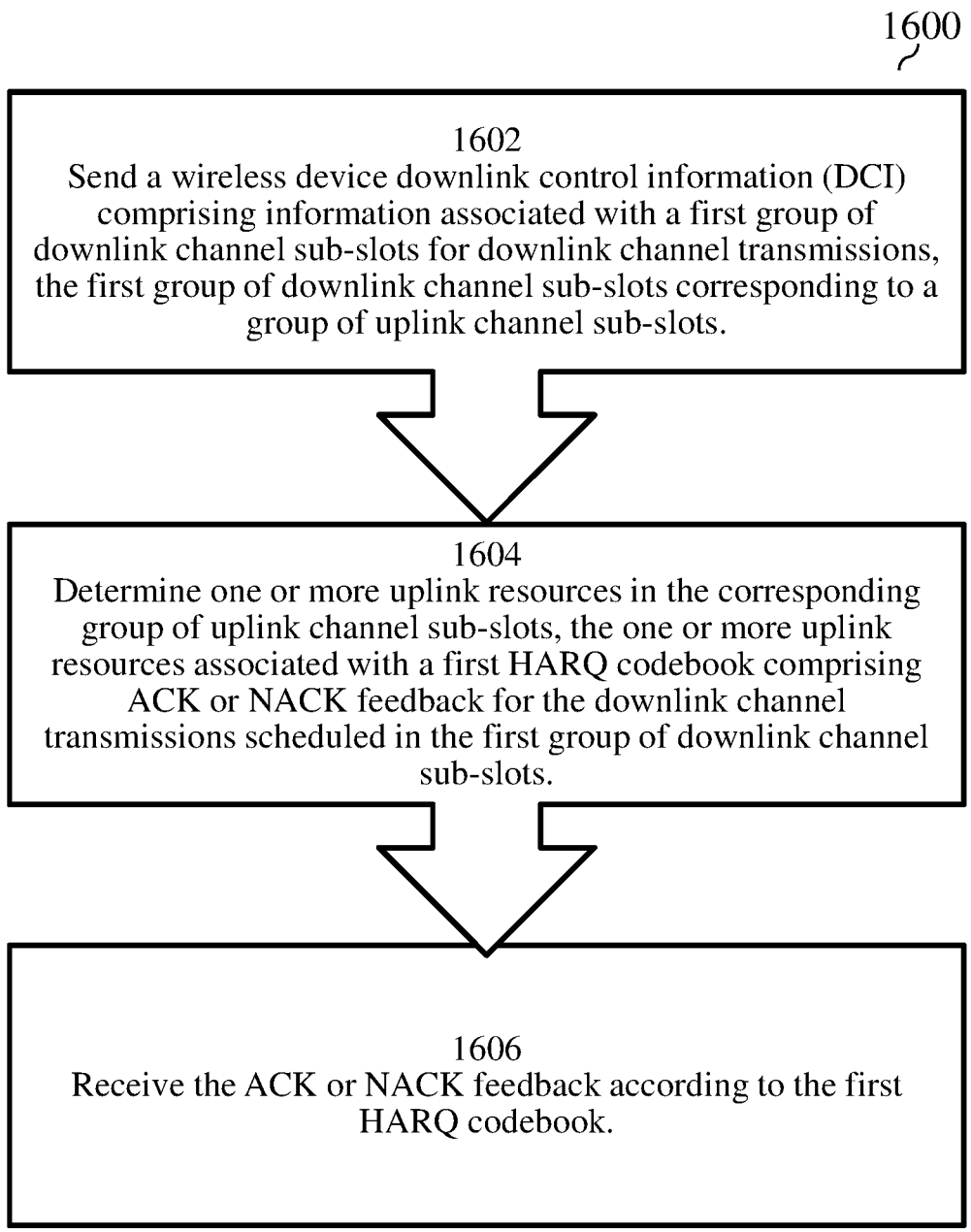

FIG. 16 depicts a method 1600 in accordance with certain embodiments. The method may be performed by a network node, examples of which are described above. The method 1600 begins at step 1602 with sending a wireless device downlink control information (DCI) comprising information associated with a first group of downlink channel sub-slots for downlink channel transmissions. In certain embodiments, the wireless device is configured to determine, based on the DCI, the first group of downlink channel sub-slots for downlink channel transmissions. The first group of downlink channel sub-slots corresponds to a group of uplink channel sub-slots. In certain embodiments, the first group of downlink channel sub-slots includes a downlink channel slot. In some embodiments, the length of the downlink channel sub-slots is different from the length of the uplink channel sub-slots. In certain embodiments, different physical downlink shared channels (PDSCHs) belong to the first group of downlink channel sub-slots. In some embodiments, the one or more uplink resources include physical uplink control channel (PUCCH) resources.

The method proceeds to step 1604 with determining one or more uplink resources in the corresponding group of uplink channel sub-slots. The one or more uplink resources are associated with a first HARQ codebook comprising ACK or NACK feedback for the downlink channel transmissions scheduled in the first group of downlink channel sub-slots. The method continues to step 1606 with receiving the ACK or NACK feedback according to the first HARQ codebook.

In certain embodiments, the method additionally includes sending the wireless device additional DCI. The additional DCI includes information associated with a second group of downlink channel sub-slots for downlink channel transmissions. The second group of downlink channel sub-slots corresponds to a second group of uplink channel sub-slots.

The method also includes determining one or more uplink resources in the corresponding second group of uplink channel sub-slots. The one or more uplink resources are associated with a second HARQ codebook comprising acknowledgement (ACK) and/or negative acknowledgement (NACK) feedback for the downlink channel transmissions scheduled in the second group of downlink channel sub-slots. The method further includes receiving the ACK and/or NACK feedback according to the second HARQ codebook. In some such embodiments, the first group of downlink channel sub-slots and the second group of downlink channel sub-slots correspond to the same downlink slot and the one or more uplink resources of the first HARQ codebook are different than the one or more uplink resources of the second HARQ codebook.

Figure 17:
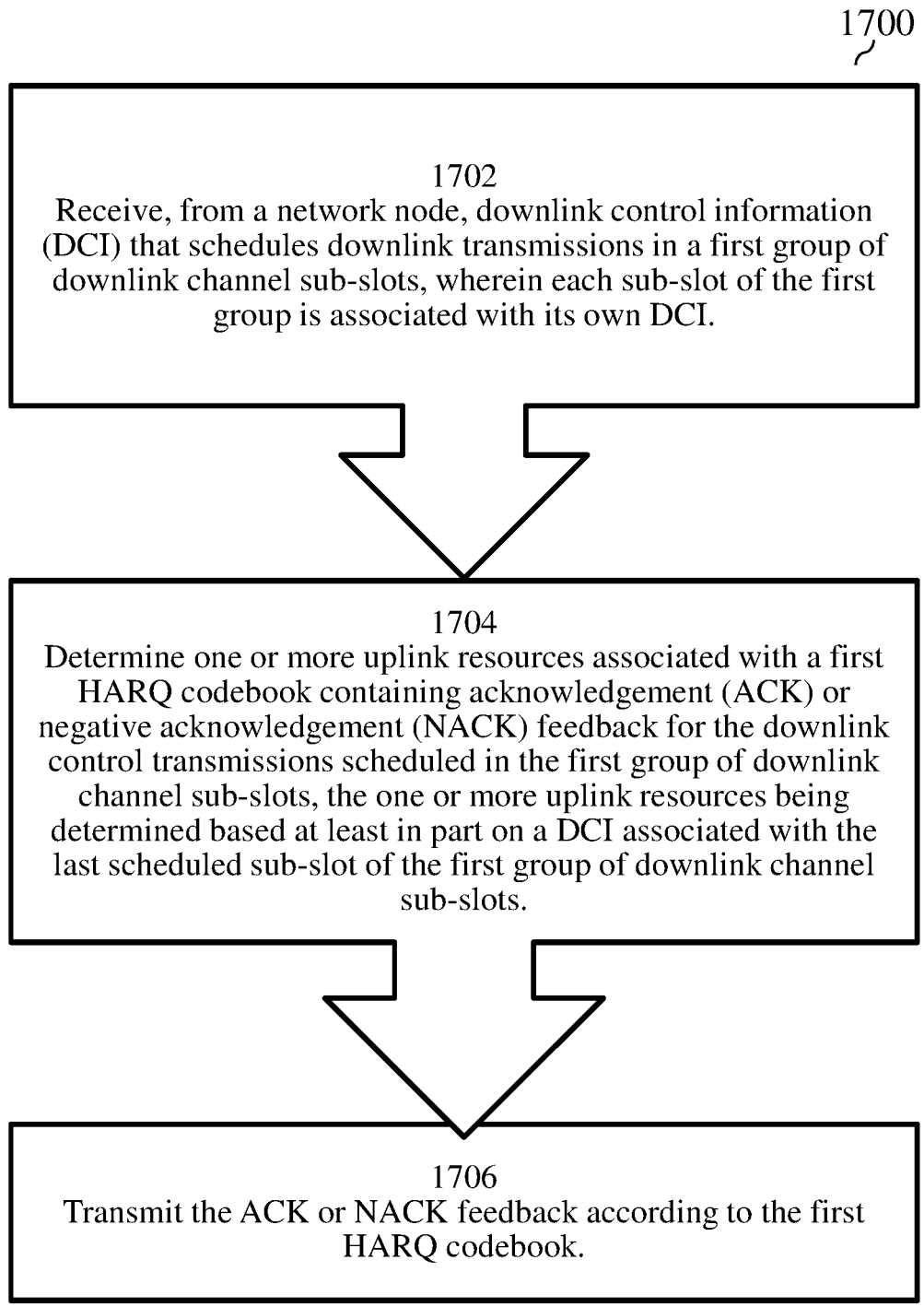

FIG. 17 depicts a method 1700 in accordance with particular embodiments. The method may be performed by a wireless device, such as a UE, examples of which are described above. The method 1700 begins at step 1702 with receiving, from a network node, downlink control information (DCI) that schedules downlink transmissions in a first group of downlink channel sub-slots. Each sub-slot of the first group is associated with its own DCI. The method proceeds to step 1704 with determining one or more uplink resources associated with a first HARQ codebook. The first HARQ codebook contains ACK/NACK feedback for the downlink channel transmissions scheduled in the first group of downlink channel sub-slots. The one or more uplink resources are determined based at least in part on the latest DCI associated with the last scheduled sub-slot of the first group of downlink channel sub-slots. In certain embodiments, the one or more uplink resources include PUCCH resources indicated by an acknowledgement resource indicator (ARI) field in the latest DCI. The method continues to step 1706 with transmitting the ACK or NACK feedback according to the first HARQ codebook.

Figure 18:
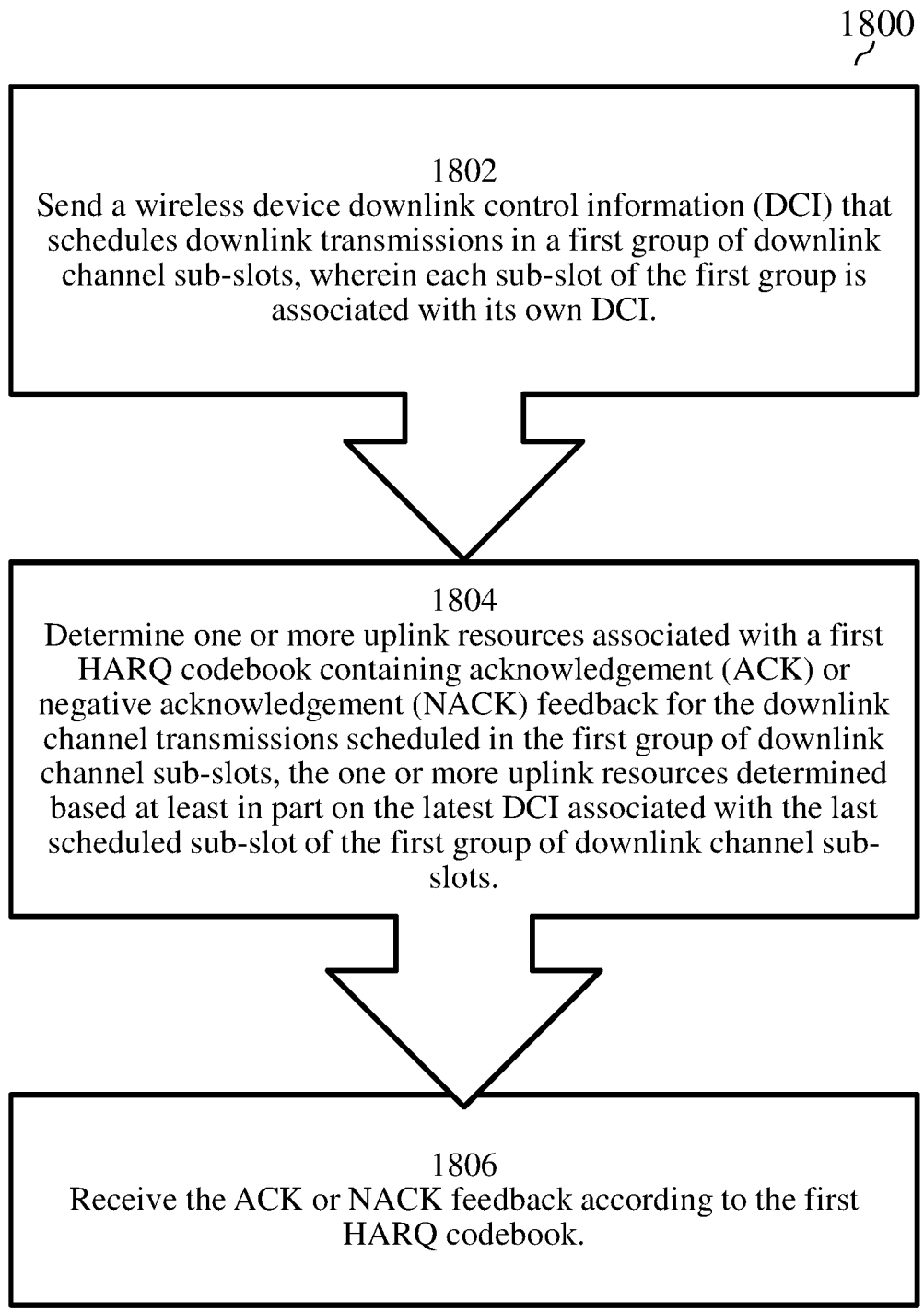

FIG. 18 depicts a method 1800 in accordance with particular embodiments. The method 1800 may be performed by a network node, such as a gNB. Embodiments of the method 1800 may include operations of sending a wireless device downlink control information (DCI) that schedules downlink transmissions in a first group of downlink channel sub-slots, wherein each sub-slot of the first group is associated with its own DCI (step or operation 1802). At an operation 1804, a processing device of the network node may determine one or more uplink resources associated with a first HARQ codebook containing acknowledgment (ACK) or negative acknowledgement (NACK) feedback for the downlink channel transmissions scheduled in the first group of downlink channel sub-slots. The one or more uplink resources may be based at least in part on the latest or most recent DCI associated with the last scheduled sub-slot of the first group of downlink channel sub-slots. In certain embodiments, the one or more uplink resources include PUCCH resources indicated by an acknowledgement resource indicator (ARI) field in the latest DCI. At an operation 1806, the processing device of the network node may receive the ACK or NACK feedback according to the first HARQ codebook from a wireless device.

Figure 19:
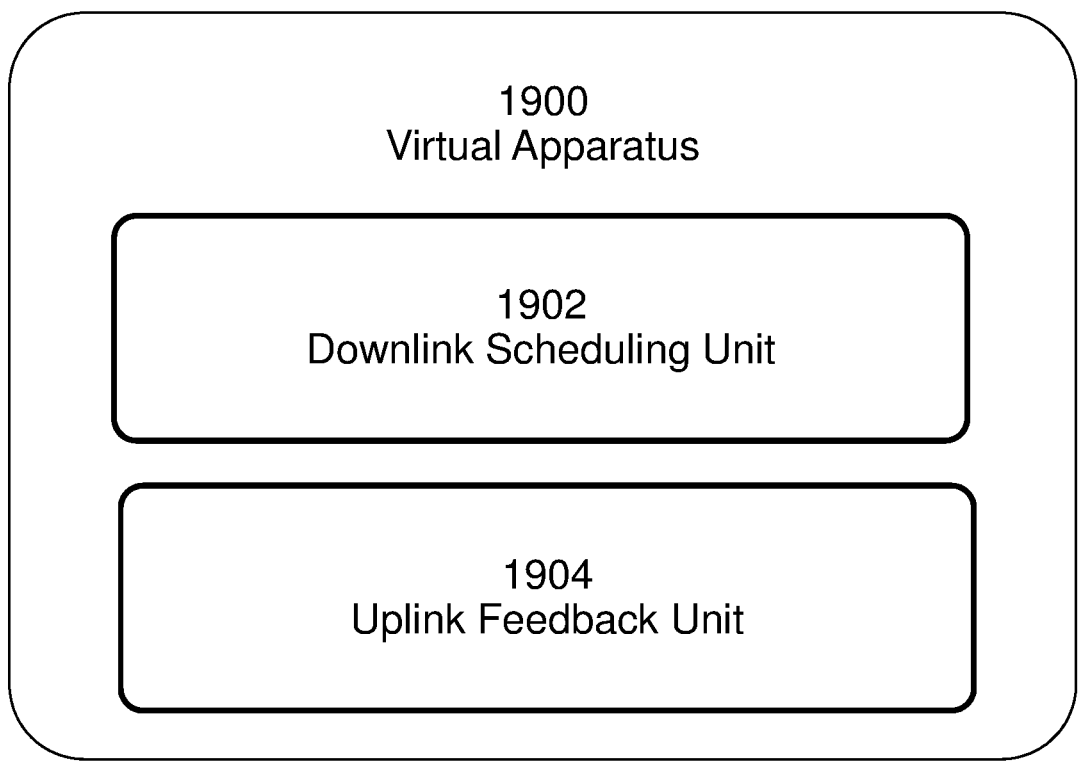
FIG. 19 is an illustration of an exemplary virtualization apparatus, in accordance with certain embodiments.

FIG. 19 illustrates a schematic block diagram of an apparatus 1900 in a wireless network (for example, the wireless network shown in FIG. 6). The apparatus may be implemented in a wireless device or network node (e.g., wireless device 110 or network node 160 shown in FIG. 6). Apparatus 1900 is operable to carry out the example methods described with reference to FIGS. 15-18 and possibly any other processes or methods disclosed herein. It is also to be understood that the methods of FIGS. 15-18 are not necessarily carried out solely by apparatus 1900. At least some operations of the methods can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause downlink scheduling unit 1902, uplink feedback unit 1904, and any other suitable units of apparatus 1900 to perform corresponding functions according one or more embodiments of the present disclosure.

As illustrated in FIG. 19, apparatus 1900 includes downlink scheduling unit 1902 and uplink feedback unit 1904. In certain embodiments, units 1902 and 1904 may be implemented in a wireless device. In such embodiments, downlink scheduling unit 1902 may receive DCI. In certain embodiments, the DCI may indicate information about downlink transmissions that have been scheduled by a network node. For example, in certain embodiments, the wireless device may determine, based on the DCI, a first group of downlink channel sub-slots for downlink channel transmissions, where the first group of downlink channel sub-slots correspond to a group of uplink channel sub-slots and are associated with one or more uplink resources in the corresponding group of uplink channel sub-slots. In some embodiments, the DCI may indicate information (e.g., ARI) for providing ACK/NACK feedback associated with the downlink transmissions. Uplink feedback unit 1904 may provide the ACK/NACK feedback associated with the downlink transmissions. In certain embodiments, downlink scheduling unit 1902 performs steps 1502, 1504, and 1506 of FIG. 15, and/or steps 1702 and 1704 of FIG. 17, and uplink feedback unit performs step 1508 of FIG. 15 and/or step 1706 of FIG. 17.

In other embodiments, units 1902 and 1904 may be implemented in a network node. In such embodiments, downlink scheduling unit 1902 may generate and send DCI to a wireless device. In some embodiments, the DCI may include information associated with a first group of downlink channel sub-slots for downlink channel transmissions, where the first group of downlink channel sub-slots corresponds to a group of uplink channel sub-slots. For example, the DCI may schedule downlink transmissions in a first group of downlink channel sub-slots, wherein each sub-slot of the first group is associated with its own DCI. Uplink feedback module 1904 may determine one or more uplink resources associated with a first HARQ codebook containing ACK/NACK for the downlink channel transmissions scheduled in the first group of downlink channel sub-slots. The one or more uplink resources may be determined based at least in part on the latest DCI associated with the last scheduled sub-slot of the first group of downlink channel sub-slots. Uplink feedback module 1904 then receives the ACK or NACK feedback according to the first HARQ codebook. In certain embodiments, downlink scheduling unit 1902 performs steps 1602 and 1604 of FIG. 16, and/or steps 1802 and 1804 of FIG. 18, and uplink feedback unit performs step 1606 of FIG. 16 and/or step 1806 of FIG. 18.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

Group A Embodiments

1. A method performed by a wireless device, the method comprising:
   receiving, from a network node, downlink control information (DCI) that schedules downlink transmissions in a first group of downlink channel sub-slots, wherein each sub-slot of the first group is associated with its own DCI;
   determining one or more uplink resources associated with a first HARQ codebook containing acknowledgment (ACK) or negative acknowledgement (NACK) feedback for the downlink channel transmissions scheduled in the first group of downlink channel sub-slots, the one or more uplink resources being determined based at least in part on a DCI associated with the last scheduled sub-slot of the first group of downlink channel sub-slots; and
   transmitting the ACK or NACK feedback according to the first HARQ codebook.

1.1. The method of embodiment 1, wherein the DCI associated with the last scheduled sub-slot of the first group is a most recently received DCI.

2. The method of embodiment 1, wherein the first group of downlink channel subslots is determined from a plurality of groups of downlink channel sub-slots, each group of downlink channel sub-slots associated with a respective group of sub-slots of downlink slots.

3. The method of embodiment 2, wherein the plurality of groups of downlink channel sub-slots are indicated explicitly.

4. The method of embodiment 2, wherein the plurality of groups of downlink channel sub-slots are determined implicitly.

5. The method of any of embodiments 1-4, wherein different physical downlink shared channels (PDSCHs) belong to the first group of downlink channel sub-slots.

6. The method of any of embodiments 1-5, wherein the one or more uplink resources comprise physical uplink control channel (PUCCH) resource(s) indicated by an acknowledgement resource indicator (ARI) field in the latest DCI.

7. The method of any of embodiments 1-6, further comprising:
   receiving, from the network node, DCI that schedules downlink transmissions in a second group of downlink channel sub-slots, wherein each sub-slot of the second group is associated with its own DCI;
   determining one or more uplink resources associated with a second HARQ codebook containing ACK or NACK feedback for the downlink channel transmissions scheduled in the second group of downlink channel sub-slots, the one or more uplink resources determined based at least in part on the latest DCI associated with the last scheduled sub-slot of the second group of downlink channel sub-slots; and
   transmitting the ACK or NACK feedback according to the second HARQ codebook.

8. The method of embodiment 8, wherein the first group of downlink channel sub-slots and the second group of downlink channel sub-slots correspond to the same downlink slot and the uplink resource(s) of the first HARQ codebook are different than the uplink resource(s) of the second HARQ codebook.

9. The method of any of the previous embodiments, further comprising:
   providing user data; and
   forwarding the user data to a host computer via the transmission to the base station.

Group B Embodiments

10. A method performed by a network node, the method comprising:
    sending a wireless device downlink control information (DCI) that schedules downlink transmissions in a first group of downlink channel sub-slots, wherein each sub-slot of the first group is associated with its own DCI;
    determining one or more uplink resources associated with a first HARQ codebook containing acknowledgment (ACK) or negative acknowledgement (NACK) feedback for the downlink channel transmissions scheduled in the first group of downlink channel sub-slots, the one or more uplink resources determined based at least in part on the latest DCI associated with the last scheduled sub-slot of the first group of downlink channel sub-slots; and
    receiving the ACK or NACK feedback according to the first HARQ codebook.

11. The method of embodiment 1, wherein the first group of downlink channel sub-slots is determined from a plurality of groups of downlink channel sub-slots, each group of downlink channel sub-slots associated with a respective group of sub-slots of downlink slots.

12. The method of embodiment 2, wherein the plurality of groups of downlink channel sub-slots are indicated explicitly.

13. The method of embodiment 2, wherein the plurality of groups of downlink channel sub-slots are determined implicitly.

14. The method of any of embodiments 1-4, wherein different physical downlink shared channels (PDSCHs) belong to the first group of downlink channel sub-slots.

15. The method of any of embodiments 1-5, wherein the one or more uplink resources comprise physical uplink control channel (PUCCH) resource(s) indicated by an acknowledgement resource indicator (ARI) field in the latest DCI.

16. The method of any of embodiments 1-6, further comprising:
    sending the wireless device DCI that schedules downlink transmissions in a second group of downlink channel sub-slots, wherein each sub-slot of the second group is associated with its own DCI;

determining one or more uplink resources associated with a second HARQ codebook containing ACK or NACK feedback for the downlink channel transmissions scheduled in the second group of downlink channel sub-slots, the one or more uplink resources determined based at least in part on the latest DCI associated with the last scheduled sub-slot of the second group of downlink channel sub-slots; and receiving the ACK or NACK feedback according to the second HARQ codebook.

17. The method of embodiment 8, wherein the first group of downlink channel sub-slots and the second group of downlink channel sub-slots correspond to the same downlink slot and the uplink resource(s) of the first HARQ codebook are different than the uplink resource(s) of the second HARQ codebook.

18. The method of any of the previous embodiments, further comprising:
providing user data; and
forwarding the user data to a host computer via the transmission to the base station.

19. The method of any of the previous embodiments, further comprising:
obtaining user data; and
forwarding the user data to a host computer or a wireless device.

Group C Embodiments

20. A wireless device, the wireless device comprising:
processing circuitry configured to perform any of the steps of any of the Group A embodiments; and
power supply circuitry configured to supply power to the wireless device.

21. A base station, the base station comprising:
processing circuitry configured to perform any of the steps of any of the Group B embodiments;
power supply circuitry configured to supply power to the base station.

22. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

23. A computer program, the computer program comprising instructions which when executed on a computer perform any of the steps of any of the Group A embodiments.

24. A computer program product comprising a computer program, the computer program comprising instructions which when executed on a computer perform any of the steps of any of the Group A embodiments.

25. A non-transitory computer-readable storage medium or carrier comprising a computer program, the computer program comprising instructions which when executed on a computer perform any of the steps of any of the Group A embodiments.

26. A computer program, the computer program comprising instructions which when executed on a computer perform any of the steps of any of the Group B embodiments.

27. A computer program product comprising a computer program, the computer program comprising instructions which when executed on a computer perform any of the steps of any of the Group B embodiments.

28. A non-transitory computer-readable storage medium or carrier comprising a computer program, the computer program comprising instructions which when executed on a computer perform any of the steps of any of the Group B embodiments.

29. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

30. The communication system of the pervious embodiment further including the base station.

31. The communication system of the previous 2 embodiments, further including the UE, wherein the UE is configured to communicate with the base station.

32. The communication system of the previous 3 embodiments, wherein:
the processing circuitry of the host computer is configured to execute a host application, thereby providing the user data; and
the UE comprises processing circuitry configured to execute a client application associated with the host application.

33. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

34. The method of the previous embodiment, further comprising, at the base station, transmitting the user data.

35. The method of the previous 2 embodiments, wherein the user data is provided at the host computer by executing a host application, the method further comprising, at the UE, executing a client application associated with the host application.

36. A user equipment (UE) configured to communicate with a base station, the UE comprising a radio interface and processing circuitry configured to performs the of the previous 3 embodiments.

37. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps of any of the Group A embodiments.

38. The communication system of the previous embodiment, wherein the cellular network further includes a base station configured to communicate with the UE.

39. The communication system of the previous 2 embodiments, wherein:
the processing circuitry of the host computer is configured to execute a host application, thereby providing the user data; and
the UE's processing circuitry is configured to execute a client application associated with the host application.

40. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

41. The method of the previous embodiment, further comprising at the UE, receiving the user data from the base station.

42. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

43. The communication system of the previous embodiment, further including the UE.

44. The communication system of the previous 2 embodiments, further including the base station, wherein the base station comprises a radio interface configured to communicate with the UE and a communication interface configured to forward to the host computer the user data carried by a transmission from the UE to the base station.

45. The communication system of the previous 3 embodiments, wherein:
the processing circuitry of the host computer is configured to execute a host application; and
the UE's processing circuitry is configured to execute a client application associated with the host application, thereby providing the user data.

46. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

47. A method implemented in a communication system including a host computer, a base station and a user equipment (UE), the method comprising:
at the host computer, receiving user data transmitted to the base station from the UE, wherein the UE performs any of the steps of any of the Group A embodiments.

48. The method of the previous embodiment, further comprising, at the UE, providing the user data to the base station.

49. The method of the previous 2 embodiments, further comprising:
at the UE, executing a client application, thereby providing the user data to be transmitted; and
at the host computer, executing a host application associated with the client application.

50. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

51. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:
the processing circuitry of the host computer is configured to execute a host application;
the UE is configured to execute a client application associated with the host application, thereby providing the user data to be received by the host computer.

55. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

56. The method of the previous embodiment, further comprising at the base station, receiving the user data from the UE.

57. The method of the previous 2 embodiments, further comprising at the base station, initiating a transmission of the received user data to the host computer.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BI Backoff Indicator
BSR Buffer Status Report
CA Carrier Aggregation
Cat-M1 Category M1
Cat M2 Category M2
CC Carrier Component
CCCH SDU Common Control Channel SDU
CDMA Code Division Multiplexing Access
CE Coverage Enhancement
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMTC enhanced Machine-Type-Communication
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet of Things
LOS Line of Sight
LPP LTE Positioning Protocol
LTE Long-Term Evolution
M2M Machine-to-Machine
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MTC Machine Type Communication
MSC Mobile Switching Center
NAS Non-Access Stratum
NB-IoT Narrowband Internet of Things
NPDCCH Narrowband Physical Downlink Control Channel
(N)PRACH(Narrowband) Physical Random Access Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RA Random Access
RAPID Random Access Preamble Identifier
RAN Radio Access Network
RAR Random Access Response RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TBS Transport Block Size
TDD Time Division Duplex
TDOA Time Difference of Arrival
TOA Time of Arrival
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device, the method comprising:
receiving, from a network node, downlink control information (DCI);
determining, based on the DCI, a first group of downlink channel sub-slots for downlink channel transmissions, the first group of downlink channel sub-slots corresponding to a group of uplink channel sub-slots and associated with one or more uplink resources in the group of uplink channel sub-slots, wherein the DCI schedules downlink transmissions in the first group of downlink channel sub-slots and each sub-slot of the first group is associated with its own DCI;
determining the one or more uplink resources based at least in part on a DCI associated with the last scheduled sub-slot of the first group of downlink channel sub-slots;
constructing a first hybrid automatic repeat request (HARQ) codebook comprising at least one of acknowledgment (ACK) and negative acknowledgement (NACK) feedback for the downlink channel transmissions scheduled in the first group of downlink channel sub-slots; and
transmitting the at least one of the ACK and NACK feedback, using the one or more uplink resources, according to the first HARQ codebook.

2. The method of claim 1, wherein the first group of downlink channel sub-slots comprises more than a downlink channel slot.

3. The method of claim 1, wherein different physical downlink shared channels (PDSCHs) belong to the first group of downlink channel sub-slots.

4. The method of claim 1, wherein the one or more uplink resources comprise physical uplink control channel (PUCCH) resources.

5. The method of claim 1, further comprising:
receiving, from the network node, additional DCI;
determining, based on the additional DCI, a second group of downlink channel sub-slots for downlink channel transmissions, the second group of downlink channel sub-slots corresponding to a second group of uplink channel sub-slots and associated with one or more uplink resources in the second group of uplink channel sub-slots;
constructing a second HARQ codebook comprising at least one of ACK and NACK feedback for the downlink channel transmissions scheduled in the second group of downlink channel sub-slots; and
transmitting the at least one of the ACK and NACK feedback, using the one or more uplink resources associated with the second group of downlink channel sub-slots, according to the second HARQ codebook.

6. The method of claim 5, wherein the first group of downlink channel sub-slots and the second group of downlink channel sub-slots correspond to the same downlink slot and the one or more uplink resources of the first HARQ codebook are different than the one or more uplink resources of the second HARQ codebook.

7. The method of claim 1, wherein the first group of downlink channel sub-slots is determined from a plurality of groups of downlink channel sub-slots, each group of downlink channel sub-slots associated with a respective group of sub-slots of downlink slots.

8. The method of claim 1, wherein the DCI associated with the last scheduled sub-slot of the first group is a most recently received DCI.

9. The method of claim 8, wherein the one or more uplink resources comprise PUCCH resources indicated by an acknowledgement resource indicator (ARI) field in the latest DCI.

10. A wireless device, the wireless device comprising:
power supply circuitry configured to supply power to the wireless device; and
processing circuitry configured to:
receive, from a network node, downlink control information (DCI);
determine, based on the DCI, a first group of downlink channel sub-slots for downlink channel transmissions, the first group of downlink channel sub-slots corresponding to a group of uplink channel sub-slots and associated with one or more uplink resources in the group of uplink channel sub-slots based on a position of the downlink channel sub-slots within a slot, wherein the DCI schedules downlink transmissions in the first group of downlink channel sub-slots and each sub-slot of the first group is associated with its own DCI;
determine the one or more uplink resources based at least in part on a DCI associated with the last scheduled sub-slot of the first group of downlink channel sub-slots;
construct a first hybrid automatic repeat request (HARQ) codebook comprising at least one of acknowledgement (ACK) and negative acknowledgements (NACK) feedback for the downlink channel transmissions scheduled in the first group of downlink channel sub-slots; and transmit the at least one of the ACK and NACK feedback, using the one or more uplink resources, according to the first HARQ codebook.

11. The wireless device of claim 10, wherein the first group of downlink channel sub-slots comprises less than a downlink channel slot.

12. The wireless device of claim 10, wherein different physical downlink shared channels (PDSCHs) belong to the first group of downlink channel sub-slots.

13. The wireless device of claim 10, wherein the one or more uplink resources comprise physical uplink control channel (PUCCH) resources.

14. The wireless device of claim 10, wherein the processing circuitry is further configured to:
receive, from the network node, additional DCI;
determine, based on the additional DCI, a second group of downlink channel sub-slots for downlink channel transmissions, the second group of downlink channel sub-slots corresponding to a second group of uplink channel sub-slots and associated with one or more uplink resources in the second group of uplink channel sub-slots;
construct a second HARQ codebook comprising at least one of ACK and NACK feedback for the downlink channel transmissions scheduled in the second group of downlink channel sub-slots; and
transmit the at least one of ACK and NACK feedback, using the one or more uplink resources associated with the second group of downlink channel sub-slots, according to the second HARQ codebook.

15. The wireless device of claim 14, wherein the first group of downlink channel sub-slots and the second group of downlink channel sub-slots correspond to the same downlink slot and the one or more uplink resources of the first HARQ codebook are different than the one or more uplink resources of the second HARQ codebook.

16. The wireless device of claim 10, wherein the first group of downlink channel sub-slots is determined from a plurality of groups of downlink channel sub-slots, each group of downlink channel sub-slots associated with a respective group of sub-slots of downlink slots.

17. The wireless device of claim 10, wherein the DCI associated with the last scheduled sub-slot of the first group is a most recently received DCI.

18. The wireless device of claim 17, wherein the one or more uplink resources comprise PUCCH resources indicated by an acknowledgement resource indicator (ARI) field in the latest DCI.

19. A method performed by a network node, the method comprising:
sending a wireless device downlink control information (DCI) comprising information associated with a first group of downlink channel sub-slots for downlink channel transmissions, the first group of downlink channel sub-slots corresponding to a group of uplink channel sub-slots, wherein the DCI schedules downlink transmissions in the first group of downlink channel sub-slots and each sub-slot of the first group is associated with its own DCI,
determining one or more uplink resources in the group of uplink channel sub-slots, the one or more uplink resources associated with a first hybrid automatic repeat request (HARQ) codebook comprising at least one of acknowledgment (ACK) and negative acknowledgement (NACK) feedback for the downlink channel transmissions scheduled in the first group of downlink channel sub-slots, wherein determining the one or more uplink resources based at least in part on a latest DCI associated with the last scheduled sub-slot of the first group of downlink channel sub-slots;
and
receiving the at least one of the ACK and NACK feedback according to the first HARQ codebook.

20. The method of claim 19, wherein the first group of downlink channel sub-slots comprises more or less than a downlink channel slot.

21. The method of claim 19, wherein different physical downlink shared channels (PDSCHs) belong to the first group of downlink channel sub-slots.

22. The method of claim 19, wherein the one or more uplink resources comprise physical uplink control channel (PUCCH) resources.

23. The method of claim 19, further comprising:
sending the wireless device additional DCI comprising information associated with a second group of downlink channel sub-slots for downlink channel transmissions, the second group of downlink channel sub-slots corresponding to a second group of uplink channel sub-slots;
determining one or more uplink resources in the second group of uplink channel sub-slots, the one or more uplink resources associated with a second HARQ codebook comprising at least one of acknowledgment (ACK) and negative acknowledgement (NACK) feedback for the downlink channel transmissions scheduled in the second group of downlink channel sub-slots; and
receiving the at least one of the ACK and NACK feedback according to the second HARQ codebook.

24. The method of claim 23, wherein the first group of downlink channel sub-slots and the second group of downlink channel sub-slots correspond to the same downlink slot and the one or more uplink resources of the first HARQ codebook are different than the one or more uplink resources of the second HARQ codebook.

25. The method of claim 19, wherein the first group of downlink channel sub-slots is determined from a plurality of groups of downlink channel sub-slots, each group of downlink channel sub-slots associated with a respective group of sub-slots of downlink slots.

26. The method of claim 19, wherein the one or more uplink resources comprise PUCCH resources indicated by an acknowledgement resource indicator (ARI) field in the latest DCI.

* * * * *